US005805474A

United States Patent [19]
Danielson et al.

[11] Patent Number: 5,805,474
[45] Date of Patent: Sep. 8, 1998

[54] PORTABLE WORK STATION TYPE-DATA COLLECTION SYSTEM HAVING AN IMPROVED HANDGRIP AND AN OPTICAL READER TO BE DIRECTED THEREBY

[75] Inventors: Arvin D. Danielson, Solon; Darald R. Schultz, Cedar Rapids, both of Iowa; Dennis Silva, San Jose, Calif.; Darrell L. Boatwright, Cedar Rapids, Iowa; Rickey G. Austin, Lisbon, Iowa; Daniel E. Alt, Cedar Rapids, Iowa; Steve Darren Friend, Felton, Calif.

[73] Assignee: Norand Corporation, Cedar Rapids, Iowa

[21] Appl. No.: 389,830

[22] Filed: Feb. 16, 1995

Related U.S. Application Data

[63] Continuation-in-part of Ser. No. 226,516, Apr. 12, 1994, Pat. No. 5,488,575, Ser. No. 307,950, Sep. 16, 1994, abandoned, and Ser. No. 309,003, Sep. 19, 1994, abandoned, Ser. No. 192,525, Feb. 4, 1994, Pat. No. 5,418,684, and Ser. No. 777,393, Jan. 7, 1992, Pat. No. 5,410,141, which is a continuation-in-part of Ser. No. 364,902, Jun. 8, 1989, abandoned, said Ser. No. 226,516, Ser. No. 307,950, and Ser. No. 309,003, each is a continuation-in-part of Ser. No.48, 873, Apr. 16, 1993, abandoned, which is a continuation-in-part of Ser. No. 23,840, Feb. 26, 1993, abandoned, which is a continuation-in-part of Ser. No. 728,667, Jul. 11, 1991, abandoned, said Ser. No. 307,950, and Ser. No. 309,003, each is a continuation-in-part of Ser. No.226,516, said Ser. No. 192,525, is a continuation of Ser. No. 17,049, Feb. 12, 1993, abandoned, which is a continuation of Ser. No. 633,500, Dec. 26, 1990, Pat. No. 5,202,817, which is a continuation-in-part of Ser. No. 626,511, Dec. 12, 1990, abandoned, which is a continuation-in-part of Ser. No. 364,902.

[30] Foreign Application Priority Data

Feb. 28, 1994 [WO] WIPO ...................... PCT/US94/02091

[51] Int. Cl.⁶ ....................................................... G06F 1/16
[52] U.S. Cl. .......................................... 364/708.1; 361/683
[58] Field of Search ........................... 364/708.1; 361/683

[56] References Cited

U.S. PATENT DOCUMENTS

| | | | |
|---|---|---|---|
| 4,075,702 | 2/1978 | Davies | 364/708.1 |
| 4,523,297 | 6/1985 | Ugon et al. | 364/709.1 |
| 4,545,023 | 10/1985 | Mizzi | 364/709.13 |
| 4,634,845 | 1/1987 | Hale et al. | 235/380 |

(List continued on next page.)

FOREIGN PATENT DOCUMENTS

| | | |
|---|---|---|
| 0096334 | 6/1983 | Japan . |
| 58-176792 | 10/1983 | Japan . |
| 0017523 | 1/1985 | Japan . |
| 2122787 | 1/1984 | United Kingdom . |
| 2201125 | 8/1988 | United Kingdom . |

OTHER PUBLICATIONS

"PEN*VIEW™ Pen Based Computer", No. 960–170–205, Norand Corporation, 1992.
*Norand Marketing Bulletin #94–016, entitled "PEN*KEY™ Single book Installation Instructions", dated Jun. 15, 1994.
*Norand News Release, entitled "Integrated Scanning Expands PEN*KEY™ 6300 Hand-Held Personal Computer Functionality", dated Nov. 1, 1994.

*Primary Examiner*—David H Malzahn
*Attorney, Agent, or Firm*—Suiter & Associates PC

[57] ABSTRACT

A portable data collection terminal system has a housing having a display screen with coincident graphic data input and a keyboard on the frontal side thereof. An accessory pod, having a width less than the width of the display screen and a handgrip extension adapted to hold a selected accessory device, such as a laser scanner, is disposed on the housing, opposite said frontal side. The accessory pod has one or two activation, diaphragm-type switches disposed in a pod wall disposed transversely to the handgrip extension and extending outwardly from, opposite the frontal side, the housing. The switch or switches are connected in parallel, if more than one, and are disposed near an end of the pod wall such that they are operable by either a user's thumb or finger.

188 Claims, 18 Drawing Sheets

U.S. PATENT DOCUMENTS

| | | | |
|---|---|---|---|
| 4,703,161 | 10/1987 | McLean | 364/708.1 |
| 4,704,604 | 11/1987 | Fuhs | 364/708.1 |
| 4,752,965 | 6/1988 | Dunkley et al. | 382/119 |
| 4,845,419 | 7/1989 | Hacker | 320/39 |
| 4,858,162 | 8/1989 | Kieffer et al. | 364/708.1 |
| 4,866,646 | 9/1989 | Nakamura et al. | 364/704.11 |
| 4,870,677 | 9/1989 | DiSanto et al. | 379/96 |
| 4,890,832 | 1/1990 | Kosaki | 273/460 |
| 4,916,441 | 4/1990 | Gombrich | 364/709.11 |
| 4,953,113 | 8/1990 | Chadima, Jr. et al. | 364/708.1 |
| 4,969,647 | 11/1990 | Micai et al. | 273/85 G |
| 4,972,496 | 11/1990 | Sklarew | 382/187 |
| 5,023,438 | 6/1991 | Watkatsuki et al. | 235/472 |
| 5,123,064 | 6/1992 | Hacker et al. | 382/313 |
| 5,133,076 | 7/1992 | Hawkins et al. | 395/800 |
| 5,155,659 | 10/1992 | Kunert | 364/708.1 |
| 5,203,003 | 4/1993 | Doner | 364/707 |
| 5,241,488 | 8/1993 | Chadima, Jr. et al. | 364/708.1 |
| 5,241,680 | 8/1993 | Cole et al. | 364/707 |
| 5,382,962 | 1/1995 | Young | 364/708.1 |
| 5,383,091 | 1/1995 | Snell | 361/732 |
| 5,404,267 | 4/1995 | Silva et al. | 361/683 |

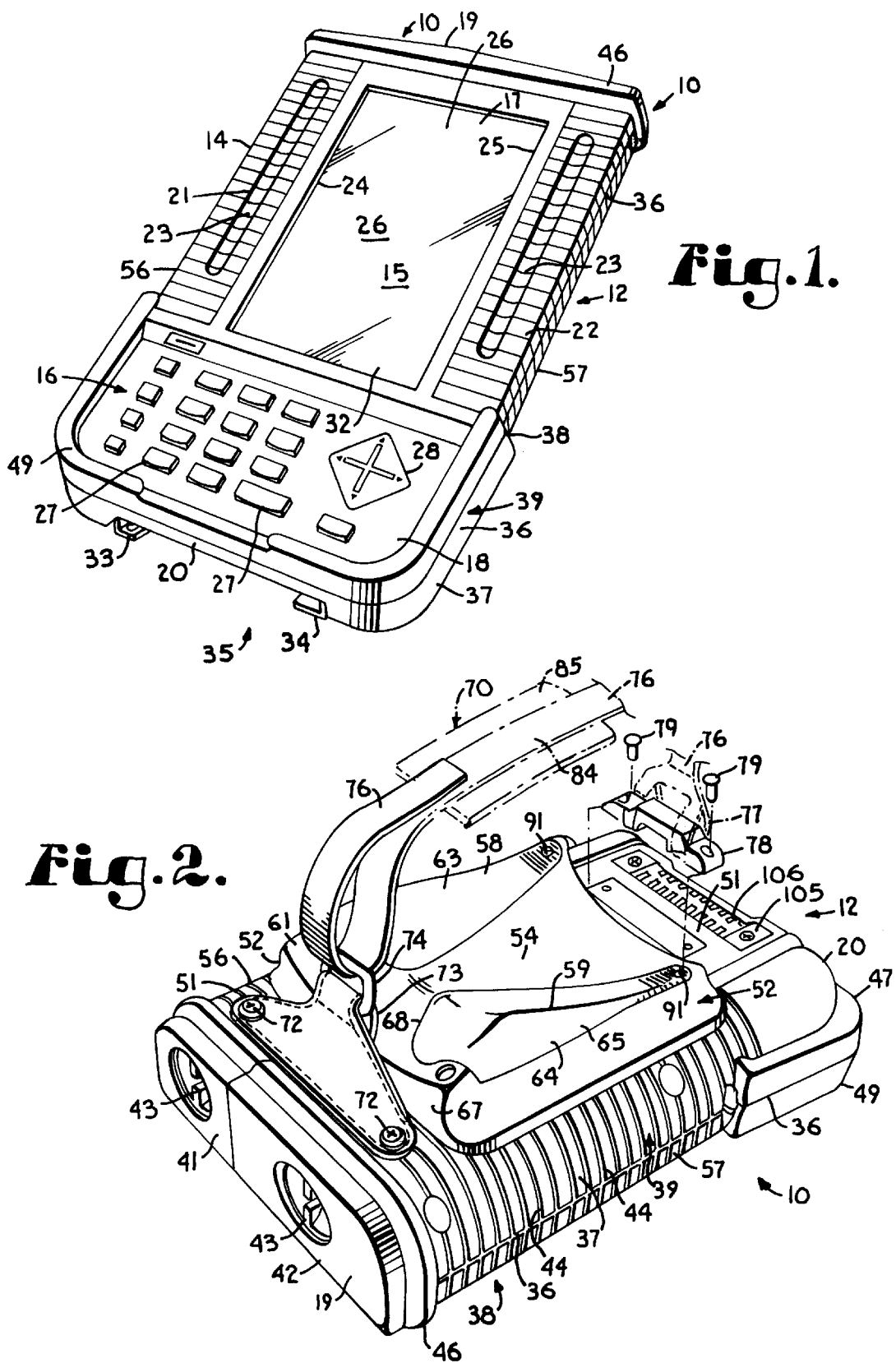

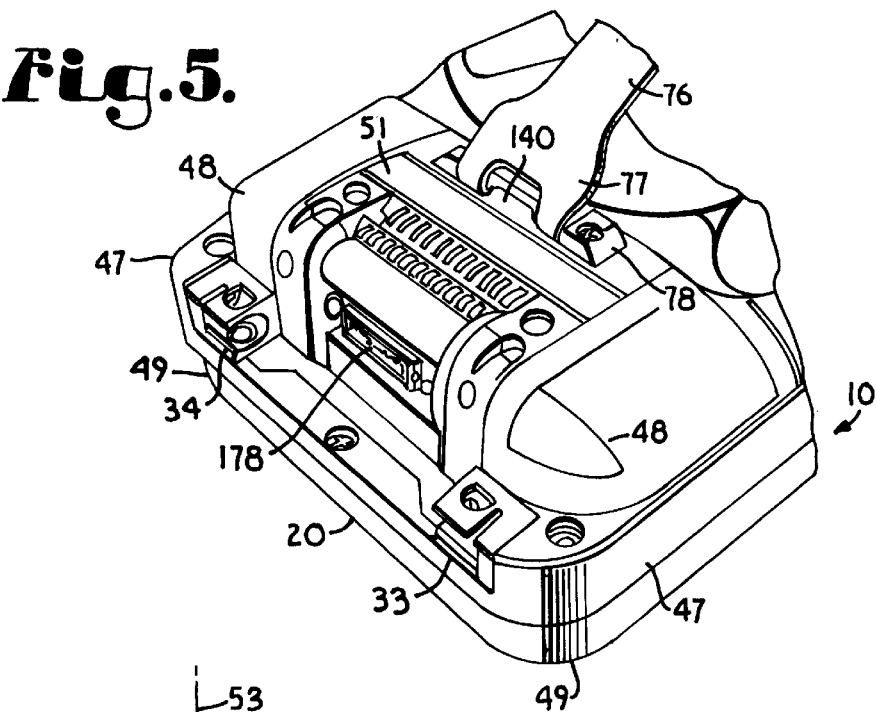
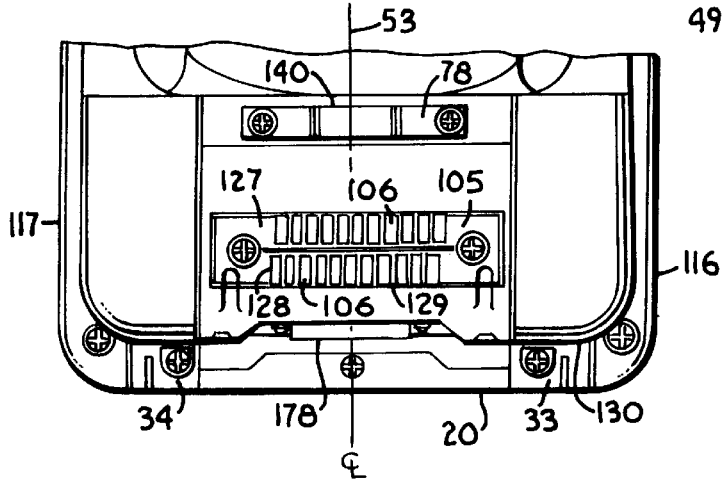
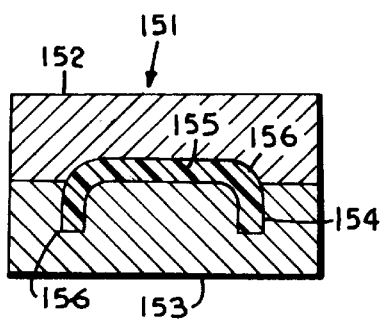
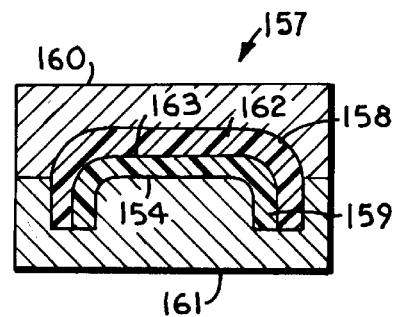

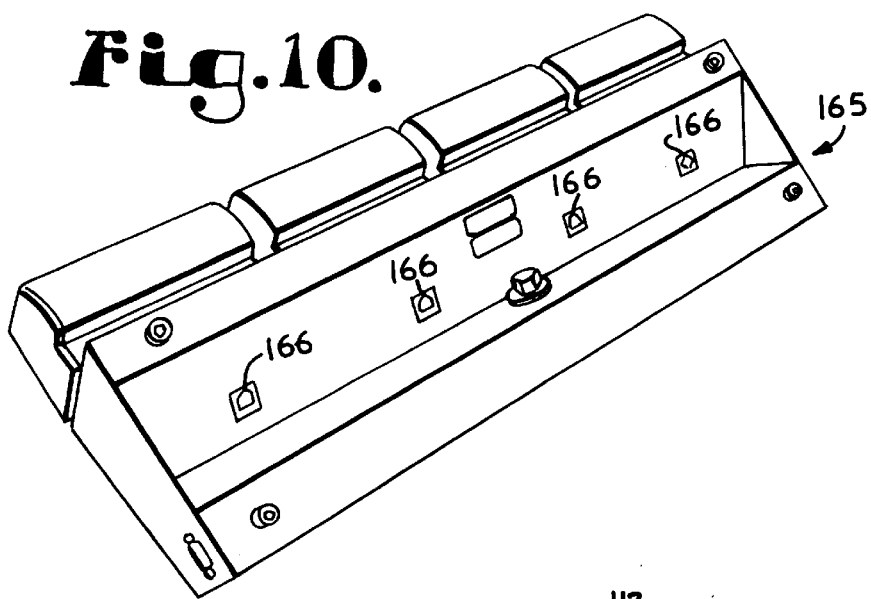
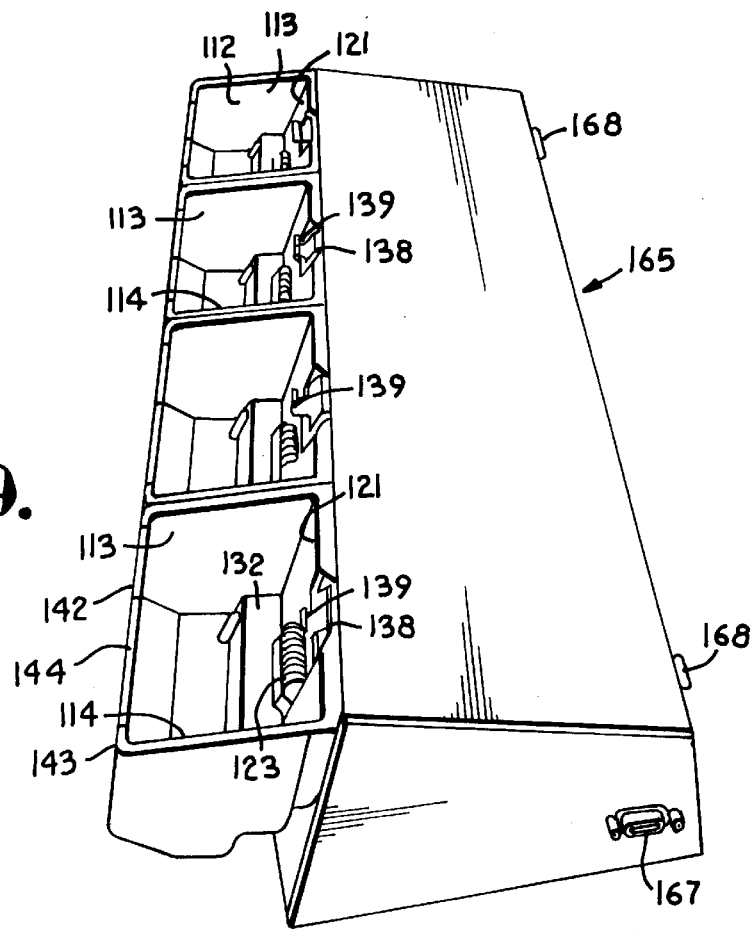

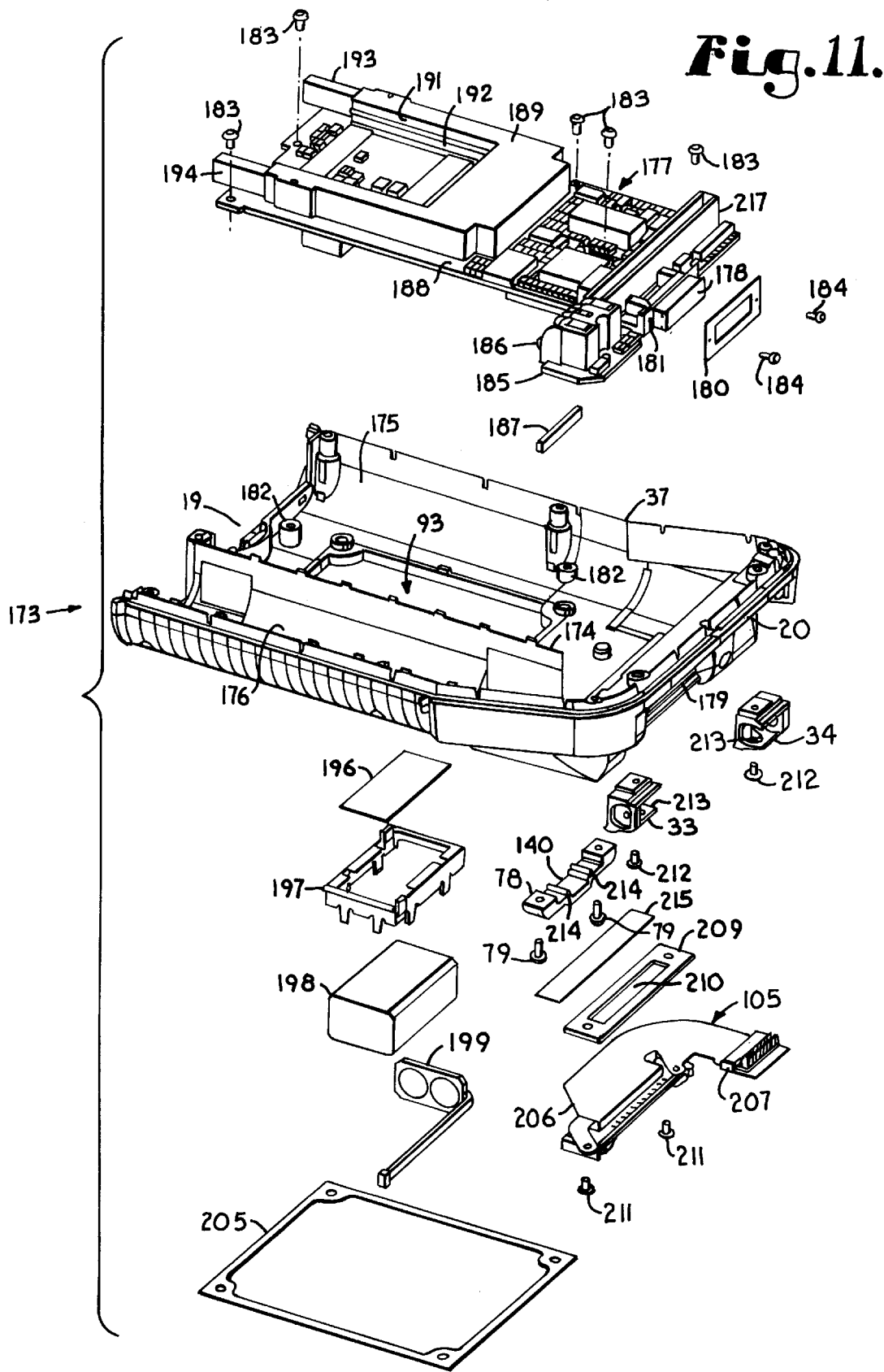

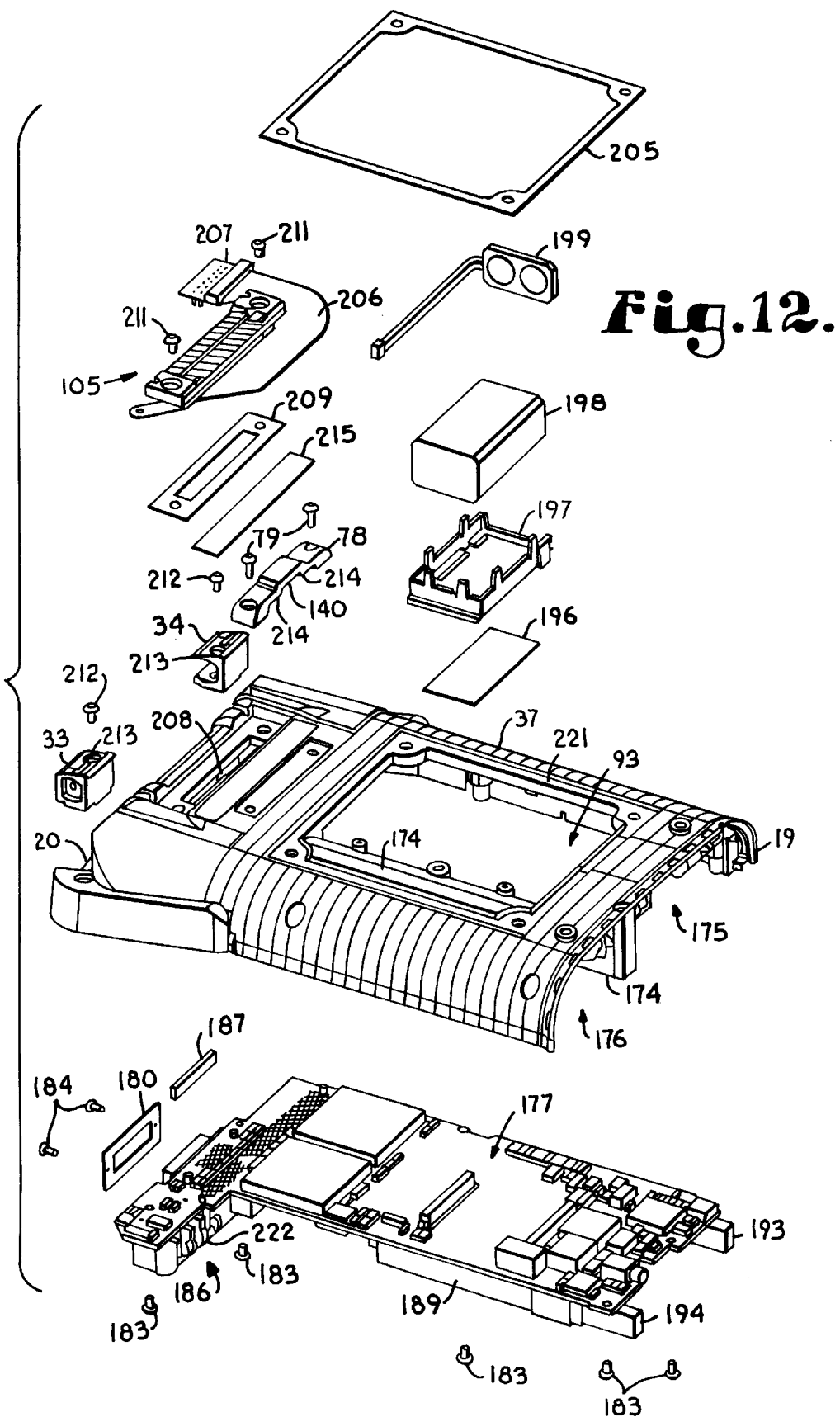

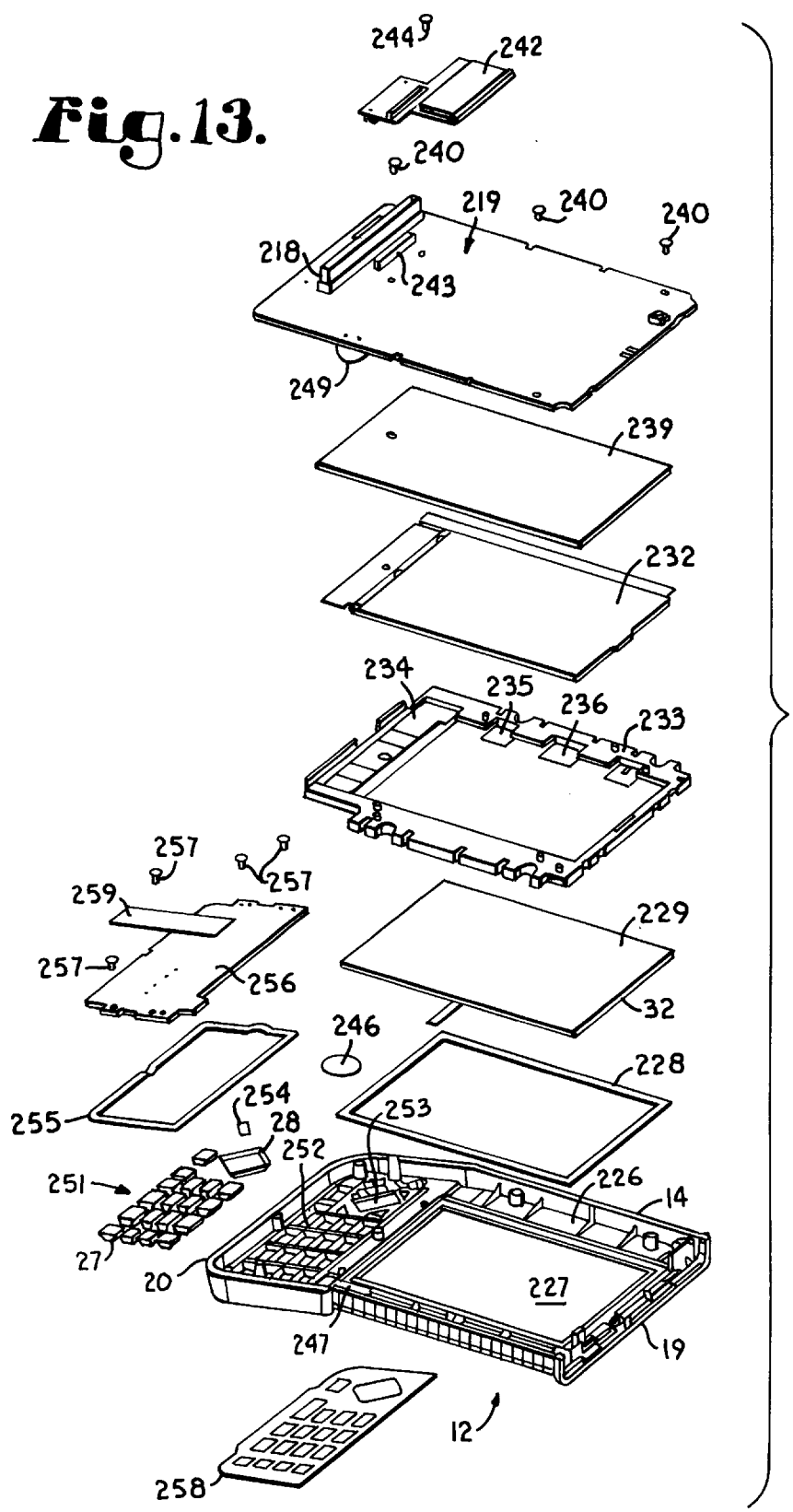

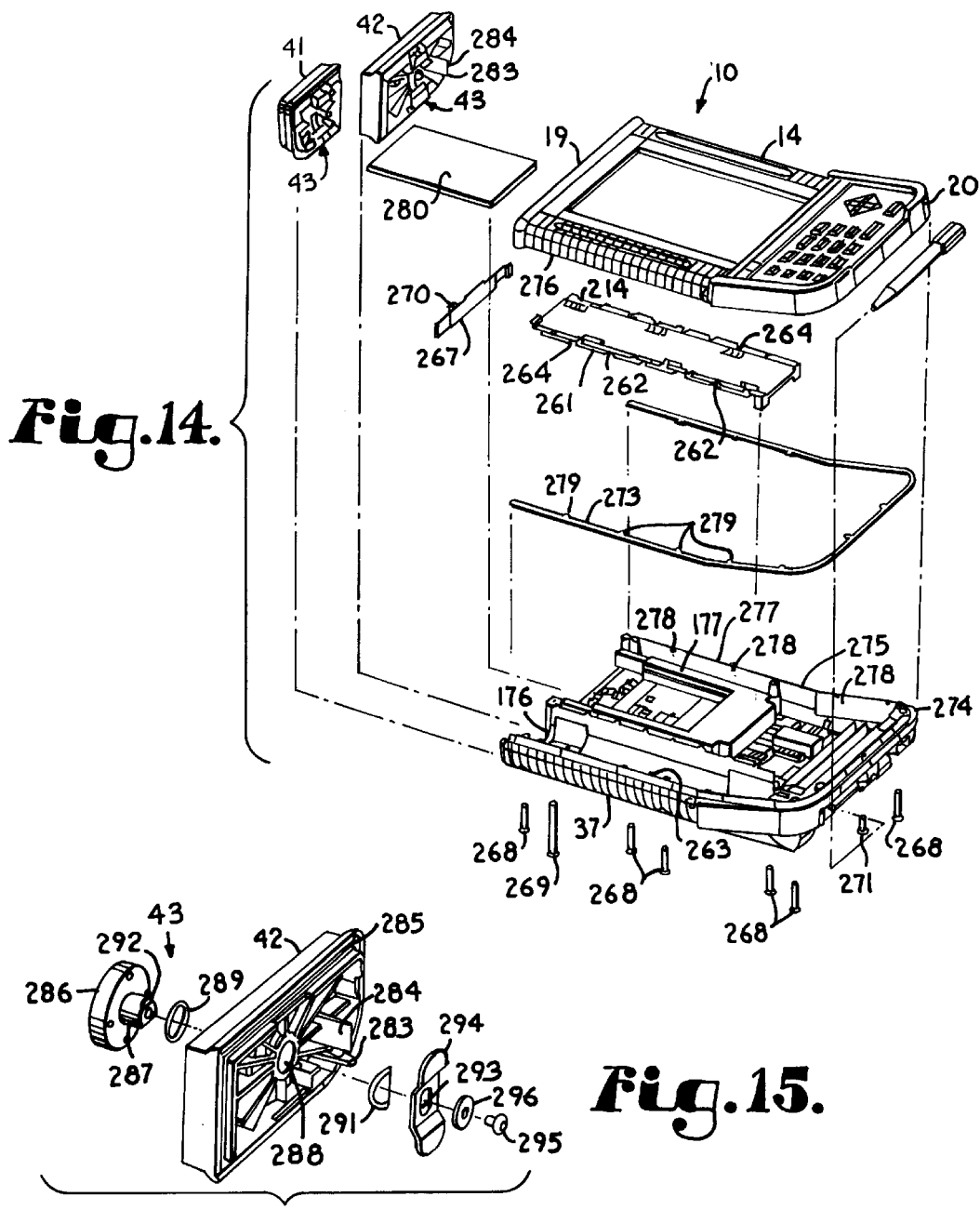
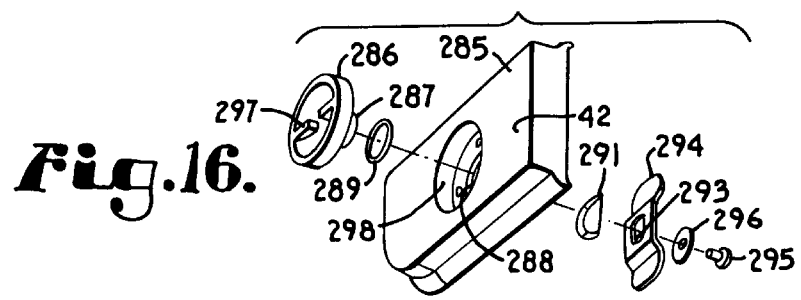

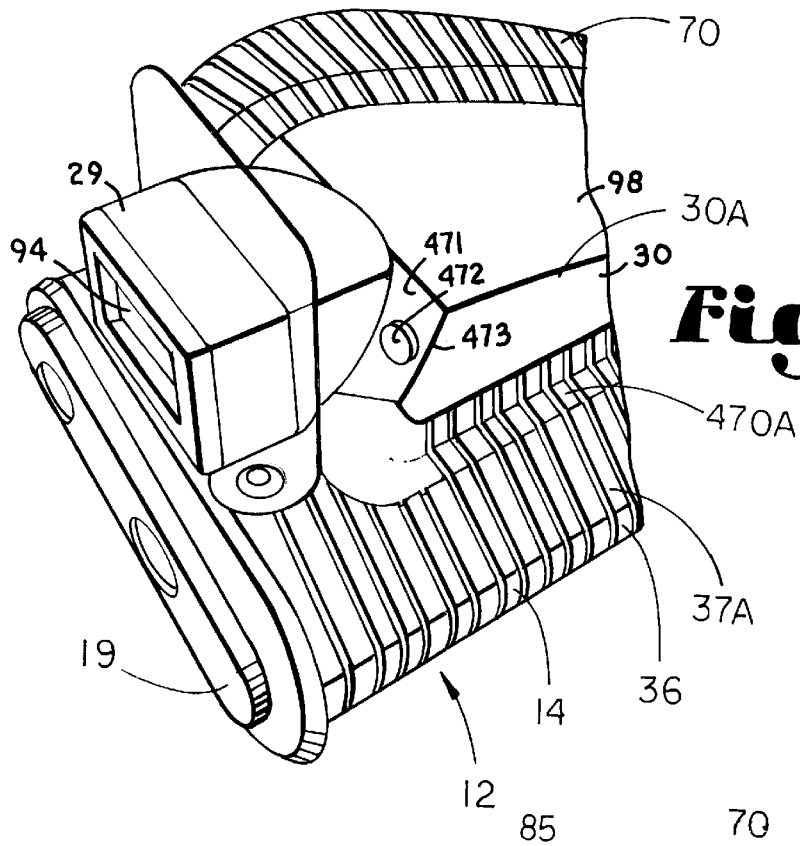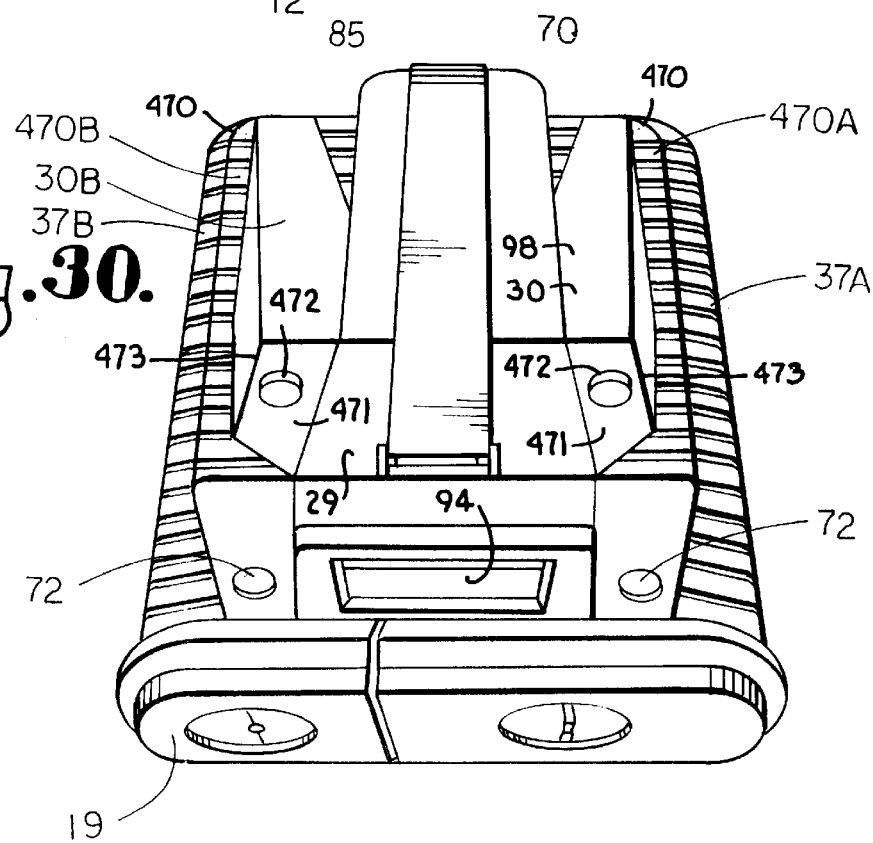

PORTABLE WORK STATION TYPE-DATA COLLECTION SYSTEM HAVING AN IMPROVED HANDGRIP AND AN OPTICAL READER TO BE DIRECTED THEREBY

CROSS-REFERNCES TO RELATED APPLICATIONS

A. Cross-Reference Pursuant to 35 U.S.C. §119

This application is a continuation-in-part of application Ser. No. 08/226,516 filed Apr. 12, 1994 (now U.S. Pat. No. 5,488,575 issued Jan. 30, 1996), of application Ser. No. 08/307,950 filed Sep. 16, 1994 (now abandoned), and of application Ser. No. 08/309,003 filed Sep. 19, 1994 (now abandoned). Said application Ser. No. 08/307,950 and said application Ser. No. 08/309,003 are each a continuation-in-part of said application Ser. No. 08/226,516. The three said applications are each a continuation-in-part of application Ser. No. 08/048,873 filed Apr. 16, 1993 (now abandoned), which is a continuation-in-part of application Ser. No. 08/023,840 filed Feb. 26, 1993 (now abandoned), which is a continuation-in-part of application Ser. No. 07/728,667 filed Jul. 11, 1991 (now abandoned).

The present application is also a continuation-in-part of application Ser. No. 08/192,525 filed Feb. 4, 1994 (now U.S. Pat. No. 5,418,684 issued May 23, 1995) which is a continuation of application Ser. No. 08/017,049 filed Feb. 12, 1993 (now abandoned), which is a continuation of application Ser. No. 07/633,500 filed Dec. 26, 1990 (now U.S. Pat. No. 5,202,817 issued Apr. 13, 1993), which is a continuation-in-part of application Ser. No. 07/626,711 filed Dec. 12, 1990 (now abandoned), which is a continuation-in-part of application Ser. No. 07/364,902 filed Jun. 8, 1989 (now abandoned), and PCT application PCT/US90/03282 filed Jun. 7, 1990 (U.S. application Ser. No. 07/777,393 filed Jan. 7, 1992 is based on said PCT application PCT/US90/03282, and is now U.S. Pat. No. 5,410,141 issued Apr. 25, 1995).

This application is also a continuation-in-part of application Ser. No. 08/777,393 filed Jan. 7, 1992 (now U.S. Pat. No. 5,410,141 issued Apr. 25, 1995), which is the U.S. National Phase of International Application PCT/US90/03282 filed Jun. 7, 1990 (published Dec. 27, 1990 as International Publication WO90/16033), which is a continuation-in-part of application Ser. No. 07/364,902 filed Jun. 8, 1989 (now abandoned).

B. Cross-Reference Pursuant to 35 U.S.C. §119

The present application also claims priority under 35 U.S.C. §119 to international application PCT/US94/02091 filed Feb. 28, 1994 (published Sep. 1, 1994 as International Publication WO94/19736) said priority is claimed through application Ser. No. 08/226,516 filed Apr. 12, 1994.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The invention relates generally to data collection and processing systems and more particularly to portable data terminals as operator manipulatable data input and output devices with display and verification of data.

The invention herein is a further improvement of related subject matter contained in the cross-referenced prior patent applications, which prior patent applications are relied upon for priority rights in previously described novel features.

Portable data terminals are generally known components of state of the art business systems. The data terminals may be taken to merchandise storage facilities for inventory control or customer service transactions, or may be used in any one of various other commercial applications to serve as data input or output devices for central data processing and control stations.

Central data processing or control stations are most useful when business data are always current and readily available. Prompt data entry and retrieval at the working level through various operator controlled portable data terminals is recognized as a basis for optimizing, among various business activities, inventory control and customer service activities, business forecasting and marketing operations, to name just a few.

Increased versatility in data input and output arrangements tends to increase power usage of the portable data terminals, thereby decreasing usage periods between battery exchanges or recharging operations. Touch sensitive or pen actuated data input systems are known. However, in the past, such pen actuated data input systems were generally limited to the use of pens for digitizer boards or in conjunction with full keyboard type computer terminals. While the former devices are considered limited in their application, the latter are comparatively bulky, even as lap top computers, and are not useful for practical data entry and retrieval in shop, warehouse, store or delivery route environments.

SUMMARY OF THE INVENTION

The objective of the present invention was early on to expand on the utility of relatively small, portable, hand-held data collection terminals. The invention recognizes a need for greater versatility in hand-held data terminals, thereby improving indirectly an overall usefulness of a business system which uses a number of these data terminals as roaming data input and retrieval devices.

It is therefore an object of the invention to provide an improved compact data input and display device with increased functionality.

It is another object of the invention to arrange an alphanumeric keyboard for multi-orientational use.

Further in accordance herewith, it is an object of the invention to provide a pen-activated data input device which interactively may be prompted through display screen prompts.

Another object of the invention is to provide a robust data terminal having a display screen sized to permit operator input via pen strokes and having the capability to change to keyboard entries interchangeably with entry via pen-type signals.

Yet another object of the invention is a power management control function implemented through software controlled microprocessor functions, the power management function including selectively shutting the data terminal down without loss of current data interchange status states on an Input-Output bus (I/O Bus).

According to one aspect of the invention, it is consequently contemplated to increase the data input capacity of a portable data terminal with a touch sensitive liquid crystal display overlay. The touch sensitive display overlay may function as a keyboard or as a provision for entering graphic data such as signatures. Another keyboard may be a numerical keyboard or may be activated as a function keyboard to supplement a touch sensitive keyboard implemented as an overlay of a display screen.

Another object of the invention is to provide an accessory pod having a wall with one or more diaphragm-type activation switches arranged to be operable by a user's thumb or finger in order to activate an accessory, such as a scanner, attached to the accessory pod.

In a particular embodiment in accordance with the invention, keys of the touch sensitive keyboard of the display screen of the portable data terminal may be selectively reorientable with respect to the data terminal. In accordance with a particular feature of the invention, the keys or key areas of the touch sensitive keyboard are reoriented by switching key assignment areas within the touch sensitive display screen and by reorienting indicia within each of the switched touch sensitive areas of the board to change the orientation of the indicia to correspond to a change orientation of the keyboard of the touch sensitive area.

Further in accordance with the invention, a keyboard is disposed adjacent a display screen of a portable data terminal in a frontal face of the data terminal. The keyboard includes an array of keys, each key having an assigned function, and an array of indicia identifying the function of each of the keys of the array. The array of indicia is disposed on a matrix removably attachable to the frontal face of the data terminal. The array of indicia may be removed and replaced by another array of indicia, showing reassigned functions of each of the keys, and the functions of the respective keys are reassigned in accordance with such other array of indicia. Alternatively, molded keys may include permanent indicia which display functions inherent to default settings of a data terminal.

Also according to the present invention, a data terminal has a display screen and graphic data input surface coincident with and disposed beneath the display screen. Data input into the graphic data input surface may be obtained either via an electromagnetic pen, also referred to as an active pen, or via a touch sensitive screen via a pointed object, such as a stylus.

Further in accordance herewith, the data terminal includes operation shadowing circuits which include a function of shadowing Input-Output (I/O) device states and a function of storing microprocessor register states during a shutdown procedure. Pursuant to the shadowing and microprocessor register storage, the data terminal may be shut down and re-activated without loss of control or I/O status data and with the ability to complete an operation in progress during the time of shutdown of the data terminal.

Further in accordance herewith, a data terminal includes a shock and weather resistant housing and a keyboard orientation with respect to a display screen which causes an included angle to protect both the keyboard and the display screen from contact with a flat hard bottom surface during a fall of the data terminal against such surface. Co-molding of shock absorbing material to the surface of the housing distributes impact forces to which the data terminal may be exposed as a result of a fall. In a preferred embodiment, resilient sealing strips interposed between access covers and the housing provide a weather-sealed housing.

A housing of the data terminal includes top and bottom or base housing shells. The base housing shell is an accessory base and has a central accessory attachment opening. The accessory attachment opening or accessory pod opening may by covered by a removable base cover when no accessory pods are attached. A base cover in accordance herewith is in a shape of a multi-function handgrip or terminal grip and stabilizer. The handgrip comprises a longitudinally centered concave, transversely peaked stabilizer shape with dual, laterally offset, symmetrical handgrip ridges with palmrest indentations for alternatively left and right hand gripping functions. The dual handgrip ridges include co-molded ribbing which also provides impact resistance. The removable base cover may be exchanged for an accessory pod which is centrally disposed, symmetrically with respect to a longitudinal central axis of the housing of the data terminal. The accessory pod has a width transverse to the longitudinal axis which is less than the transverse width of the data terminal, the accessory pod including a handgrip portion by which an operator may hold the data terminal while operating the data terminal.

A handstrap may be attached to upper and lower ends of the base housing shell. The handstrap has a split loop attachment to the lower housing shell. The split loop attachment straddles a docking latch eye disposed on the base housing shell. The docking latch eye engages a latch hook on a dock when the data terminal is inserted into a docking device. Co-molded material disposed on the top housing shell of the data terminal cooperates with the latch eye to retain resilient pressure on the latch hook for retaining surface contacts on the data terminal in contact with mating spring contacts of the docking device while the data terminal remains inserted into the docking device.

Contacts in each of transverse rows of surface contacts disposed at a lower end of the base housing shell are transversely groupwise staggered and longitudinally overlap with the contacts of the other, adjacent group to provide a wider contact surface for engaging spring contacts of a docking device, when the respective data terminal is inserted into a docking receptacle of the docking device. The invention contemplates a single-receptacle docking device and a multi-cavity or multi-receptacle docking device. The data terminal as well as the docking devices feature Ethernet as well as RS-232 or compatible or equivalent LAN (Local Area Network) communications provisions.

The base cover of the data terminal is exchangeable for any of a number of other bases or base pods, each base having a particular one of a number of desirable accessory features. At least one of the base pods is contemplated to include a scanner for reading indicia which may be disposed on a surface external and separate from the data terminal. The scanner may, for example, be a bar code scanner. An operator may insert fingers or a portion of the hand between the housing and one of the handstrap provisions to retain the unit by friction between the hand and the strap.

In addition, the accessory pod has one or two activation, diaphragm-type switches disposed in a pod wall disposed transversely to the handgrip extension and extending outwardly from, opposite a frontal side, the housing. The switch or switches are connected in parallel, if more than one, and are disposed near an end of the pod wall such that they are operable by either a user's thumb or finger.

Various other features and advantages of the invention will become apparent when the detailed description below is read in reference to the appended drawing.

BRIEF DESCRIPTION OF THE DRAWINGS

The detailed description refers numerically to elements shown in the drawing wherein:

FIG. 1 shows a pictorial frontal view of a data terminal showing a top shell of a housing with a touch sensitive display screen in combination with a keyboard in accordance with an embodiment of the present invention;

FIG. 2 shows a pictorial view of an underside of the data terminal shown in FIG. 1, showing a bottom or base shell of the housing of the data terminal, and showing a handstrap and various other features of the present invention;

FIG. 5 is a partial, pictorial view of the data terminal shown in FIGS. 1, 2 and 3, showing a lower end of the base shell of the housing of the data terminal in greater detail;

FIG. 6 is a schematically simplified partial view of the data terminal showing the lower end of the base shell of the data terminal of FIGS. 1, 2 and 3, and illustrating particularly an offset of one row of surface contacts with respect to a second row;

FIG. 7 is a schematic representation of a mold to illustrate a first step in a co-molding process;

FIG. 8 is a schematic representation of a mold to illustrate a second step in a co-molding process;

FIG. 9 is a pictorial representation of a multi-cavity docking device for data terminals in accordance with an embodiment of the invention;

FIG. 10 is a simplified pictorial representation of the docking device shown in FIG. 9, showing an underside of the docking device with a cable connector recess in a housing of the docking device;

FIG. 11 is a composite pictorial representation of the inside of the base shell of the housing of the data terminal depicted in FIGS. 1, 2 and 3, showing major structural elements which are included in a base shell assembly and illustrating further a preferred assembly with selected hardware of the base shell assembly;

FIG. 12 is a composite pictorial representation of the base shell of the housing and such components as shown in FIG. 11, yet viewing the external surface of the base housing shell and showing the related components in a correspondingly oriented view;

FIG. 13 is a composite pictorial representation of the interior of the upper housing shell of the data terminal depicted in FIGS. 1, 2 and 3, showing components that become assembled to the upper shell of the housing of the data terminal in accordance with an embodiment of the invention;

FIG. 14 is a composite pictorial representation or exploded view of the data terminal depicted in FIGS. 1, 2 and 3, illustrating an assembly of the base shell assembly to the top shell assembly, and showing further components of the respective data terminal including a PCMCIA memory card and memory card cavity and battery cavity covers;

FIG. 15 is a composite pictorial representation of the memory card cavity cover, showing the interior surface of the cover in greater detail and showing elements of a door latch;

FIG. 16 is a composite pictorial representation of the memory card cavity cover as in FIG. 15, but showing an exterior surface of the cover or door;

FIG. 29 is an oblique and fragmentary, perspective underside view of the portable data collection terminal showing a pod wall with an activation switch of an accessory pod comprising a scanner; and FIG. 30 is a longitudinal and fragmentary, perspective underside view of the portable data collection terminal showing a pod wall with two activation switches of the accessory pod comprising a scanner, according to the present invention;

DETAILED DESCRIPTION OF THE INVENTION

Figure 3:
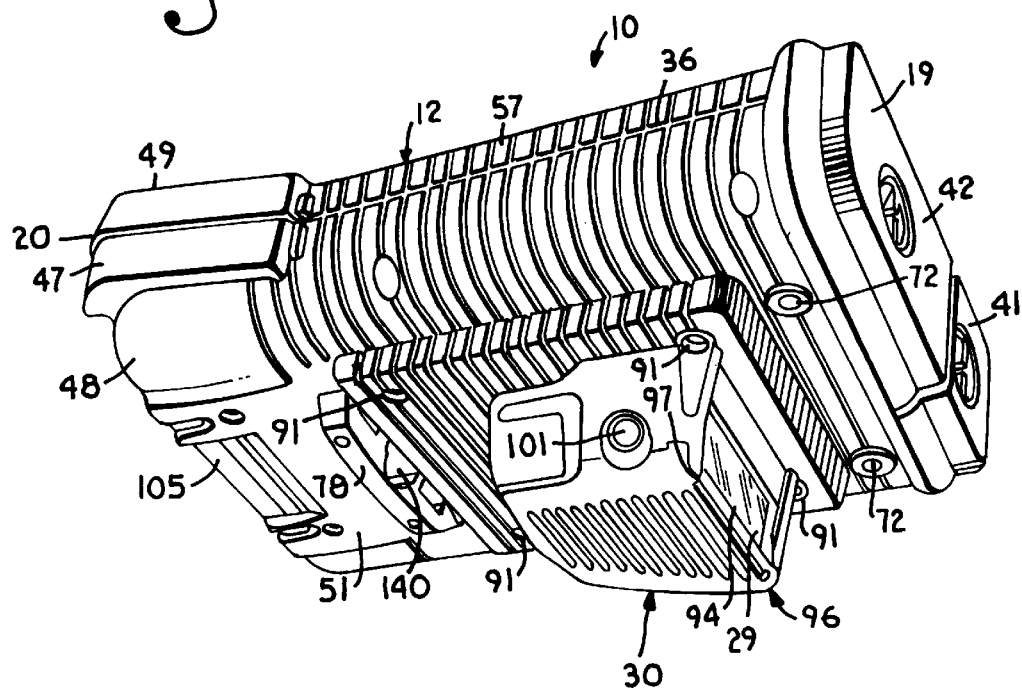
FIG. 3 shows the data terminal shown in FIGS. 1 and 2, and showing further an accessory pod in place of a combination handgrip base plate.

FIG. 1 shows a portable data collection terminal or data terminal which is designated generally by the numeral 10. The data collection terminal 10 is a handheld, portable unit, which is understood in the art as being powered by a self-contained power source. Such a portable data terminal 10 may operate in what is referred to as a batch mode in which data are collected by, and stored within, the data terminal 10 to be transferred to an alternate data processing unit or host computer (not shown) in a comprehensive "batch" type data transfer operation. In the alternative, the data terminal 10 may be in communication with such a host computer in an interactive or on-line mode via a data communications link, such as a radio frequency transceiver arrangement or a cable-type communications connection.

The data terminal 10, as described herein and as viewed from above, has an elongate, generally rectangularly shaped housing 12. The elongate housing 12, preferably of a high-impact-strength plastic material, encases the data terminal 10. Various types of moldable high-impact-strength plastic materials are known and are generally available. The pictorial representation of the data terminal 10 in FIG. 1 depicts prominently a frontal shell or top shell 14 of the housing 12. A display screen 15 and a keyboard 16 are located, respectively, in an upper end portion 17 and a lower end portion 18 adjacent an upper end 19 and a lower end 20 of the housing 12.

The display screen 15 is preferably a state of the art liquid crystal display screen ("LCD screen"). State of the art LCD screens generally employ "double super twist" technology. This type of screen is found to provide satisfactory viewing contrast under most direct lighting conditions. It is further possible and desirable to provide backlighting for LCD screens. Power considerations relating to the portability of the data terminal 10 may require a selective disablement or the ability to turn off a backlighting feature.

As is apparent from FIG. 1, the LCD screen 15 is of a comparatively large size, occupying the upper end portion 17 of the frontal face of the top shell 14 except for longitudinal left and right boundary regions 21 and 22 respectively which are molded gripping regions. Each of the gripping regions 21 and 22 features a longitudinal, sculptured finger grip indentation 23 which extends longitudinally in parallel with left- and right-hand longitudinal edges 24 and 25 of the screen 15. The keyboard 16, being limited in size by the available area on the frontal shell 14, functions primarily as a "numerical" keyboard. However, cursor manipulation and menu based prompts facilitate a variety of dedicated alpha-numeric information entry and retrieval.

The screen 15 has a rectangular, dot addressable display area 26 of 320 (in width) by 480 (in length) pixels which are controlled to operate in a standard VGA display format with 16 gray scales. The referred-to backlighting is automatically temperature compensated to adjust for differences in luminescence over an expected range of temperatures. At present, an operating range of −4 to +122 degrees Fahrenheit is contemplated.

The keyboard 16 is a numeric 21-key tactile keyboard. Keys 27 generally are color coded according to functions to set out and aid in distinguishing between various functions. In addition, four cursor keys are arranged in a direction-coordinated cluster 28. When the cursor keys are used to manipulate various alpha-numeric menu displays and prompts, the numeric keyboard in conjunction with text prompts appearing on the screen can direct an operator in little time through complex inventory or order taking problems. Data entry is further enhanced by a code reader or laser scanner 29 which may be disposed in an accessory pod 30 (as illustrated in FIG. 3, for example), or a comparable scanner may be coupled through a communications I/O port, as will become apparent from the overall description of the data terminal 10.

Data entry is further enhanced by a touch sensitive active screen area 32 which is provided as an overlay to extend over the entire area of the LCD screen 15. The touch sensitive active surface area 32 may be implemented in a currently preferred manner, for example, either through capacitive or resistive switching and sampling techniques to determine coordinates of a point on the surface area 32 against which a contact pressure is exerted. The overlay area 32 is essentially transparent, such that information displayed on the screen 15 remains clearly discernible. The touch sensitive area 32 is activated by a passive pen or stylus which may be used to contact a single or a sequence of definable area locations to delineate pen-written data or information. The intelligent contents of information entered via stylus may be interpreted by software contained within the data terminal 10. Such software may include graphics programs or may include OCR programs for character recognition. It would be possible, for example, that the touch sensitive active area 32 be selectively configured as a keyboard for manual input of alphabetical or special characters. As a further advantageous alternative, software may provide only part of the entire display screen 15 with special keys to be touch-activated by such a data input stylus. In a special case, data prompts may be scrolled up or down on the screen 15 and may be activated in the alternative by cursor positioning and depression of one of the keys 27 to indicate that the selection has been chosen, or by being touched with the stylus to indicate a corresponding selection. Stylus clips 33 and 34 provide, in combination with a recessed stylus cavity, a recessed stylus holder 35 at the lower end of the data terminal 10.

FIG. 1 further shows a parting line 36 which extends peripherally about the housing 12 of the data terminal 10. The parting line 36 constitutes a lower boundary of the top or frontal shell 14 and an upper boundary of a bottom or base shell 37 of the housing 12. An assembly of the data terminal 10 is facilitated by upper and lower subassemblies 38 and 39 which are disposed in the upper housing shell 14 and the lower housing shell 37, respectively.

FIG. 2 shows the data terminal from its underside, showing prominently the base shell 37 of the housing 12. The pictorial view of the data terminal 10 shown in FIG. 2 also shows the upper end 19 of the housing 12. As can be seen, the parting line 36 between the frontal shell 14 and the base shell 37 of the housing 12 is not continuous across the upper end 19 of the housing 12. Instead, the upper end 19 shows a battery door 41 and a memory card door 42 both of which provide access to respective parts of the data terminal 10. The doors 41 and 42 are individually removable, such that access may be gained through either without opening the other. Each of the doors 41 and 42 features a quarter-turn quick release lock assembly 43. The quick release lock assemblies 43 are identical to each other, even though the battery door 41 is somewhat shorter than the memory card door 42, as can be ascertained from FIG. 2. A major body portion of the bottom shell 37 features a continuation of evenly spaced transverse grooves 44 in the lateral gripping regions 21 and 22 of the frontal shell 14 (see FIG. 1). The transversely arranged grooves 44 may be looked upon as being ornamental, but the grooves also enhance the roughness of the respective housing shells, thereby providing a better grip adhesion to decrease a risk that the data terminal 10 accidentally slips from the grip hands of an operator. Alternatively, the grooves 44 could be ridges. However, the grooves 44 are preferred and more readily molded than such ridges. The regions of both the upper and lower ends 19 and 20 show smoothly textured surfaces which are comparatively more resilient, impact shock absorbing rubber moldings. The doors 41 and 42 feature a rounded ridge 46 which continues transversely adjacent the upper end 19 all around the housing 12. Similarly impact resistant, resilient shock protective regions 47 and 48 of the base shell 37 and a corresponding shock protective region 49 of the frontal shell 14 offer protective shielding to the lower end 20 of the data terminal 20. In brief reference to FIGS. 1 and 2, it is to be noted that the upper end portion 17 is disposed at an angle of about seven degrees with respect to the lower end portion 18. The deviation of the two portions from a coextensive longitudinal direction serves better operator access to both the LCD screen and the keyboard 16, and the included angle between the two tends to position the LCD screen 15 away from damaging contact should the data terminal 10 fall with the screen 15 facing down.

FIG. 2 shows centrally disposed on an underside 51 of the base shell 37 a removable base cover or grip plate 52. The grip plate 52 is sculptured symmetrically about a central, longitudinal plane (shown as centerline 53 in FIG. 6). The plane of symmetry should be visualized as cutting perpendicularly through the center of the housing 12 and through the upper and lower ends 19 and 20. A central portion 54 of the grip plate 52 is concavely formed or inwardly curved with respect to such central plane, the indented portion 54 forming a central, rounded channel 54 which slopes gradually at an angle in a direction of the upper end 19 away from the display screen 15. The sculptured form of the grip plate blends, on left and right sides 56 and 57 of the data terminal 10, toward the underside 51 of the base shell 37, forming left and right ridges 58 and 59. A sloped head surface 61 extending transversely to the longitudinal extent of the housing 12 forms a third, transverse ridge 62 adjacent the upper end 19 of the housing 12. Resilient, molded left and right rubber gripping pads 63 and 64 feature a pattern of soft, parallel molded ribs to make the ridges 58 and 59 more slip resistant.

The described, multi-ridged, sculptured grip plate 52 provides various positions in which an operator may hold or support the data terminal 10. The positions are best described in reference to FIGS. 1 and 2. In a first support position, the data terminal 10 may rest on an operator's upper leg adjacent the knee while the operator is seated. The longitudinally sloping concave channel 54 has the effect of tilting the display screen toward the operator, providing an improved viewing angle of the display screen 15. The concave channel 54 conforms generally to the shape of the leg.

In another position the data terminal may rest in an operator's hand, with the operator's thumb resting in the sculptured finger grip indentation 23 and pointing toward the upper end 19 of the housing 12. The operator's hand grips the terminal around the adjacent side of the housing 12, either the left side 56 or the right side 57, depending on whether the left or right hand is holding the data terminal 10. Either three or four fingers grip the respective resilient gripping pad 63 or 64, the index finger possibly gripping an upper edge 67 of the grip plate 52, or, alternatively, resting in a forward gripping indent 68 of the respective gripping pads 63 or 64.

In yet another supported operating position of the data terminal 10, the operator's hand may be positioned, palm up, across the underside 51 of the base shell 37, with the operator's thumb resting along the respective gripping pad 63 or 64. The operator's fingers grip the respective left or right side 56 or 57 of the housing, with the finger tips resting in the respective finger grip indentation 23 adjacent the display screen 15. The latter cross-grasping hold on the data terminal also may take advantage of a handstrap 70 which may be attached to the underside 51 of the base shell 37 to extend longitudinally from adjacent the upper end 19 to adjacent the lower end 20 of the housing 12.

The handstrap 70 shown in FIG. 2 has a transverse upper attachment end 71 with two transverse attachment points 72 adjacent the upper end 19. The attachment end 71 may be screwed, buttoned, clasped or otherwise attached to the underside 51 of the base shell 37. A strap loop 73 of the attachment end 71 holds a strap ring 74 through which a strap 76 may be looped. The strap 76 terminates adjacent the lower end 20 in a bifurcated or forked strap loop 77 which is attached through a holder bracket 78 to the underside of the base shell 37. The holder bracket 78 may be quickly fastened to the underside 51 by two screws 79 or equivalent fasteners and similarly removed for replacement or removal of the strap loop 77. When the strap 76 is looped through the ring 74 it may be attached to itself via convenient hook and loop fasteners in strap regions 83 and 84, a predetermined length of the fastening area 84 providing for adjustment of the effective length and tightness of the handstrap 70. A hand pad 85 is contemplated to provide padding for an operator's hand inserted between the handstrap 70 and the grip plate 52 in the manner described.

The left and right ridges 58 and 59 together with the underside 51 of the base shell adjacent the lower end 20 of the housing 12 further form a rather stable pedestal for supporting the data terminal 10 against a flat surface of a table, for example. In the latter supported position, the angular shape of the ridges with respect to the display screen 15 places the display screen at a tilted position toward the operator.

FIG. 3 is another view of the data terminal 10. In particular, the underside 51 of the base shell 37 of the housing 12 is shown with the already described combination handgrip base plate or grip plate 52 (see FIG. 2) removed, and with the accessory pod 30 attached in its place. Both the grip plate 52 and the accessory pod 30 use common attachment points 91 through which the respective accessory pod 30 or grip plate 52 is screwed as a rectangular cover plate 92 to the underside 51 of the base shell 37 to cover a base shell accessory opening 93 (see FIG. 11) through which one or more of various available accessories may become attached to the data terminal 10 as heretofore described.

The accessory pod 30 shows in particular the scanner 29 disposed behind a scanning window 94, by which bar code symbols may be scanned. The accessory pod 30 may further contain a radio frequency transceiver 96 either in place of the code scanner or reader 29 or in combination therewith. When the radio transceiver 96 is incorporated into the accessory pod 30 of the data terminal 10 in combination with the scanner 29, a planar antenna 97 may be placed peripherally about the scanning window 94, or it may, for example, be molded into a plastic housing 98 which forms the outer configuration of the accessory pod 30 shown in FIG. 3.

Laterally disposed on the accessory pod 30 are left and right scanner trigger buttons 101, only the one on the right side being visible in FIG. 3, by which an operator may trigger the operation of the scanner 29 while pointing the data terminal 10 with the upper end 19 longitudinally in the direction of the codes or information to be read.

The data terminal 10 is shown in FIG. 3 without a handstrap, the transverse attachment points 72 are consequently not used and the holder bracket 78 is mounted to the underside 51 without retaining the strap holder 77. Both FIGS. 2 and 3 show a surface contact assembly 105 disposed centered at the lower end 20 of the housing 12. The surface contact assembly 105 is an arrangement of a plurality of surface contacts 106 which are preferably arranged in two laterally offset rows of the surface contacts 106, such that one of the contacts 106 in one row is preferably centered on a gap between two of the contacts 106 in the second row. This type of arrangement has been found to allow access to a greater number of electrical connections within a comparatively small surface area of the surface contact assembly 105.

Figure 4:
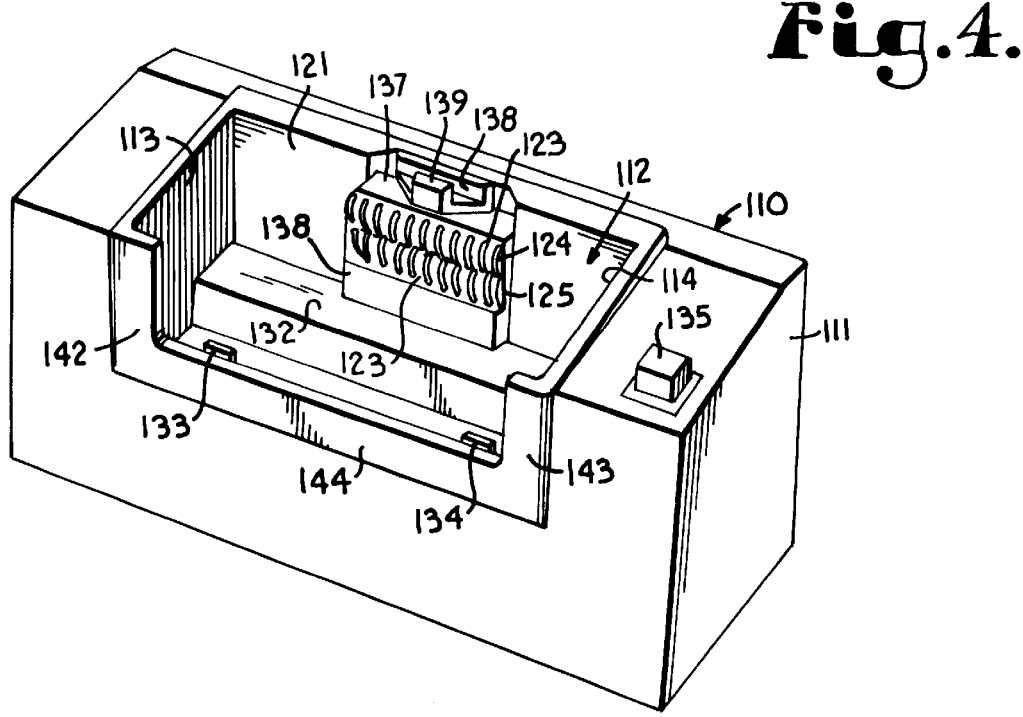
FIG. 4 is a pictorial representation of a docking device with a docking cavity for receiving and removably retaining the data terminal shown in FIGS. 1, 2 and 3 during storage, data transfer or battery charging operations.

FIG. 4 in combination with FIGS. 5 and 6 illustrates best the use of the surface contacts 106 in conjunction with a docking device which is designated generally by the numeral 110. The docking device 110 has a housing 111 within which there is a single docking cavity 112. The docking cavity 112 has a width between opposite left and right hand side walls 113 and 114 to accept the width of the lower end 20 of the data terminal 10. When the data terminal 10 is inserted into the cavity 112, opposite left and right hand lower sides 116 and 117 of the data terminal 10 fit between the respective left and right hand side walls 113 and 114. Upon insertion of the data terminal 10 in the docking device 110, the left hand lower side 116 of the data terminal 10 rests in sliding contact against the left hand side wall 113, and the right hand lower side 117 is disposed correspondingly next to the right hand side wall 114 of the cavity 112.

Centered in a back wall 121 of the cavity 112, there is disposed a spring contact assembly 122 which shows a plurality of spring contacts 123 which are grouped in upper and lower contact rows 124 and 125, respectively. Upon insertion of the lower end 20 of the data terminal 10 into the docking cavity 112 of the docking device 110, the spring contacts 123 in the upper row 124 engage with corresponding ones of the surface contacts 106 in an upper row 127 of the surface contact assembly 105. The surface contacts 106 disposed in a lower row 128 of the surface contact assembly 105 correspondingly make contact with the spring contacts 123 in the lower row 125 of spring contacts in the docking device 110. Also, ridges 129 separate adjacent ones of the surface contacts 123 in each contact row 127 and 128. Thus, when the data terminal 10 is inserted into the docking cavity 112, the spring contacts 123 of the upper row 124 ride over the ridges 129 of the lower row 128 of surface contacts 106 minimizing the risk of contact with other than designated surface contacts and spring contacts.

A ledge 132 within the docking cavity 112 shown in FIG. 4 corresponds to an offset 130 (see FIG. 6) in the molded shape of the lower end 20 of the housing 12. The stylus clips 33 and 34 are, of course, not of the resilient and readily deformable shock protecting rubber material as the molded regions 47, 48 and 49, of the housing 12, for example. Thus, two ejector bars 133 and 134 may be activated to move upward against those rigid housing portions at the respective locations of the stylus clips 33 and 34. The ejector bars 133 and 134 are coupled via a lever linkage (not shown) in a conventional manner to a pushbutton 135, such that a downward push on the pushbutton 135 would cause an upward movement of the ejector bars 133 and 134 to raise the data terminal 10 upward within the docking cavity 112.

Again in reference to FIGS. 4, 5 and 6, above a ledge 137 formed by an assembly block 138 for the spring contacts 123, a retainer bracket 136 has a retainer prong 139 which extends upward. The retainer prong 139 is disposed to fit within a central recess 140 that is formed by the holder bracket 78. The engagement of the retainer prong 139 with the recess 140 of the holder bracket 78 retains the underside 51 of the base shell 37 positioned to retain the spring contacts 123 of the docking device 110 in contact with the surface contacts 106 to minimize any risk of contact bounce between the two when the docking device 110 is used in a vibration prone environment, such as a vehicle, for example.

In reference to FIGS. 3 and 4, an advantageous cooperative use of the resilient shock absorbing molded material regions 49 on the frontal housing shell 14 can be explained. When the data terminal 10 is inserted into the docking device 110 and an operator urges the data terminal 10 toward the back wall 121 to capture the retainer prong 139 in the recess 140 behind the holder bracket 78, the lower end 20 of the housing 12 of the data terminal 10 is urged away from the back wall 121 of the docking cavity 112 by the combined spring force exerted by the spring contacts 123. The spring force urges the lower end 20 toward and against front cavity ledges 142 and 143. The molded resilient material of the top shell regions 49 resiliently contact the inner surfaces of the ledges 142 and 143. This causes the retainer prong 139 to be resiliently urged outward against the holder bracket 78. The resilient retaining force between the spring contacts 123 and the resilient material in the regions 49 generates a friction hold of the resilient material 49 against the respective ledges 142 and 143. As a result, though simple in the approach, the inserted data terminal 10 is retained in the docking cavity with a measurable retaining force as a result of some compression of the resilient material 49 against the ledges 142 and 143. The retaining force secures the data terminal 10 within the docking cavity 112 even though the docking cavity 112 only extends upward along the housing 12 to terminate substantially at the holder bracket 78. One resulting advantage is that the docking device 110 does not interfere with either the grip plate 52 or with a more protruding accessory pod 30 that may be attached to the data terminal 10. The lateral ledges 142 and 143 are complemented in their resilient holding function by a transverse ledge 144. However, the three ledges 142, 143 and 144 engage only the peripherally disposed resiliently molded portions of the frontal shell 14 at the lower end of the housing, leaving exposed the keyboard 16 when the data terminal 10 is retained within the docking device 110. Also, the engagement between the spring contacts 123 in the docking device 110 and the surface contacts 106 of the data terminal 10 remains bounce resistant while the data terminal 10 is retained in the docking device 110. The engagement between the contacts 106 and 123 is used to couple both power and system communication to the data terminal 10. Thus, on a reverse side of the docking device (not shown) typical power and communications connectors may couple the docking device 110, for example, to RS 232, RS 485, Ethernet local area network (LAN) hard wired cables, and also provide proper external power to operate the data terminal 10 and to recharge its internal batteries during docking periods. The plurality of spring contacts 123, schematically simplified, represent such typical communications and power connections.

From the above description of a friction type retention mechanism for holding the data terminal 10 within the docking device or station 110 depicted in FIG. 4, in further reference to FIG. 5, the significance of the bifurcated strap holder 77 becomes more apparent. The attachment of the strap 76 through the holder bracket 78 is convenient. However, the just described second function of the holder bracket 78, namely to contribute to the secure engagement of the spring contacts 123 with the surface contacts 106 and to contribute to the retention of the data terminal 10 in the docking device 110, is of yet greater significance. The bifurcated strap holder 77 satisfies all conditions without interference with the docking procedures.

As already described in related prior applications, the resilient regions, including the material 49, may be integrated into the shape of the housing 12 in a co-molding process. The term "co-molding", as used herein, refers to a known manufacturing process wherein a part, such as the base shell 37, is first molded, for example, in an injection molding process. In reference to FIGS. 7 and 8, FIG. 7 depicts a simplified cross-sectional view of a first mold 151. An upper mold part 152 is closed against a lower mold part 153, and a thermoplastic molding material is injected. The injected material cools and hardens to form, for example, a part 154 in complementary upper and lower molding cavities 155 and 156 of the respective upper and lower molds 152 and 153.

Referring to FIG. 8, the molded part 154 is thereafter inserted into an second mold 157 which has molding cavities 158 and 159 in upper and lower mold shells 160 and 161, respectively. The cavities 158 and 159 are larger and of altered shape when compared to the first cavities 155 and 156. The molding cavities 158 and 159 not only receive the already molded part 154, but also allow space for the injection of a second molding material, as, for example, thermoplastic rubber material 162. The molded part 154 is disposed within the second mold 157 to form with its outer surface 163 one boundary surface of the space into which the thermoplastic rubber 162 will be injected. Heat energy from the injected hot rubber material 162 tends to plasticize the outer surface 163 of the already molded part 154 to form a somewhat homogeneously linked boundary region along the surface 163 of the molded part 154. The boundary region conforming with the surface 163 has been found to yield a strong bond between the two molded materials or parts 154 and 162. The bond is essentially leak proof. The co-molding process appears therefore ideal for forming various parts such as the described housing shells 14 and 37 with a combination of rigid structural portions with impact resistance and resiliently yielding elements for shock absorbing or sealing functions. The bond appears also not to be confined to a planar surface along the original surface 163. Instead the boundary surface 163 appears converted into a boundary region 163 having a depth along the original surface 163. The region 163 tends to permit a greater dispersion of shear forces. As a result, impact forces tend to become more evenly distributed and dispersed across the surface of the underlying co-molded parts, such as the top and base housing shells 14 and 37, when compared with a typical surface-adhered shock absorbing material.

FIGS. 9 and 10 depict a multi-cavity docking station 165 which features, as a preferred example, four identical docking cavities 112, essentially the same as the single docking cavity 112 of the docking device 110 as described with respect to FIG. 4. The cavities 112 are also defined within the bounds of the opposite side walls 113 and 114, the back wall 121 and the forward ledges 142, 143 and 144. The communicative engagement and retention of one or more of the data terminals 10 in respectively one or more of the four docking cavities 112 proceeds as described with respect to FIG. 4. FIG. 10 shows an underside of the docking station 165 with a formed recess 164 in the underside to facilitate cabling connections. The multiple-cavity docking station 165 may provide, for example, multiple communications links, such as four Ethernet LAN connectors 166 that are coupled to corresponding ones of the spring contacts 123 in the respective four docking cavities 112. A serial connector 167 and power connectors 168 provide communications and power to each of the docking cavities 112.

FIG. 11 shows a composite pictorial representation of the base shell 37 of the housing 12, and of major components that are assembled to the base shell 37 as a subassembly 173 of the data terminal 10. Looking into the base shell 37, an interior molded wall 174 divides the interior of the base shell 37 into a circuit board cavity 175 and into a battery cavity 176. The base shell accessory opening 93 is centered within the base shell 37 and extends partly over the battery cavity 176. However, the wall 174 is rounded toward the battery cavity 176 and closes off access through the accessory opening 93 to the battery cavity 176. An input-output circuit board assembly 177 (I/O board assembly 177) is placed into the circuit board cavity 175 and pushed toward the lower end 20 of the base shell 37. A communications connector 178 becomes aligned with and is pushed through a corresponding connector aperture 179 at the lower end 20 of the base shell 37. A rubber seal 180 becomes interposed between the inner surface of the base shell 37 and the connector mounting flange 181 to provide a weather resistant seal peripherally about the connector aperture 179. Once the I/O board 177 is moved forward to extend the communications connector 178 through the aperture 179, the I/O board 177 is aligned with mounting bosses or standoffs 182 and is fastened in position using assembly screws 183. The communications connector 178 is also fastened with two screws 184 to the base shell 37.

The I/O board 177 is of generally rectangular configuration, except for a lateral board extension 185 which supports battery contacts 186. When the I/O board 177 is placed as described, the lateral board extension 185 is disposed at the lower end of the battery cavity 176. A battery stop shim 187 is used between the base shell 37 and the lateral board extension 185 to support the lateral board extension 185.

Mounted to an upper surface 188 of the I/O board 177 is a PCMCIA connector 189. The PCMCIA connector 189 is of a double-slotted card connector capable of receiving two type II PCMCIA memory cards. First and second vertically layered guide tracks 191 and 192 receive first and second memory cards, respectively. A first card release button 193 and a second card release button 194 extend outward toward the upper end 19 of the housing 12. The release buttons 193 and 194 are accessible from the upper end of the housing 12 to selectively release a card from either one of the guide tracks 191 or 192 by a push of the respective release button. After assembly of the I/O board assembly 177 into the base shell 37, other components shown in FIG. 11 below the base shell 37 are assembled from or to the exterior of the base shell 37. A resilient pad or label 196 may be placed on the underside of the I/O board assembly 177 aligned with a site of a backup battery holder 197. The backup battery holder 197 is pushed into place on the underside of the I/O board assembly 177. A 9-volt battery 198 serves as backup battery for the data terminal 10. The backup battery 198 is connected to a connector terminal on the I/O board assembly 177 via a connector and power strap 199. A resilient gasket 205, coated with a contact adhesive, is placed about the periphery of the base shell accessory opening 93. The annular outline of the gasket 205 indicates comparatively the outline of the accessory opening 93 which is otherwise partly concealed in the pictorial view of FIG. 11.

The surface contact assembly 105 includes on its underside a flexible ribbon cable 206 which is coupled at one end to the surface contacts 106 and at the other end to a ribbon cable pin connector 207. Assembly of the surface contact assembly 105 necessitates a 180 degree turn of the assembly 105 in a horizontal plane and the insertion of the ribbon cable connector 207 through a respective surface contact mounting opening 208 (see FIG. 12) in the base shell 37. A resilient gasket 209 is first placed about such opening 208, such that the ribbon cable 206 extends through an opening 210 in the gasket as well as through the opening 208 in the base shell 37. The ribbon connector 207 is subsequently coupled to a mating connector socket on the I/O board assembly 177. The surface contact assembly 105 is fastened to the underside of the base shell 37 by two screws 211. Each of the stylus clips 33, 34 is attached to the underside of the base shell 37 at its lower end 20 by a single screw 212 inserted through the respective stylus clip via an oversize access aperture 213. A respective, inner corner formed in the base shell 37 as a seat for the stylus clips 33, 34 assures seating of the clips 33, 34 without rotation. An underside of the holder bracket 78 has molded ridges 214 which delineate the lateral boundaries of the recess 140 and maintain separation of the bifurcated strap holder 77, thereby retaining the recess 140 clear to accept the prong 139 as described above with respect to FIG. 4. The holder bracket 78 is attached to the underside of the base shell 37 by two screws 79. The component identified by the numeral 215 is a label or model identification plate 215 which is routinely attached to the underside of the base shell 37. An I/O connector 217 mates with an I/O connector strip 218 on a main logic board 219 shown in FIG. 13

FIG. 12 is a pictorial composite drawing of the components described in reference to FIG. 11, further depicting the undersides of the respective components including that of the base shell 37. The access opening 93 is defined by a peripheral locator ridge 221, and the sealing gasket 205 is placed peripherally just outside of the locator ridge 221. A curved continuation of the cavity divider wall 174 provides a smooth insertion surface for an elongate battery to be inserted into the battery cavity 176. It is also to be noted that there are shown a combination of three battery contact elements as the battery contacts 186. A third battery contact element may be used in accordance herewith as a battery control contact element 222 for sensing the temperature of a rechargeable battery during recharging operations.

FIG. 13 is a pictorial composite drawing of the frontal or upper housing shell 14, showing the housing shell 14 as viewed from below, looking at an interior or shallow cavity 226 of the upper housing shell 14. A major portion adjacent the upper end 19 of the housing 12 is taken up by a display screen area 227 which is an opening 227 in the upper housing shell 14. A peripheral seal 228 is located and adhesively attached to the inside of the upper housing shell 14 peripherally about the screen area opening 227. A touch sensitive screen 229 having a touch sensitive screen area 32 is aligned with and assembled to the screen area opening 227. Since the touch sensitive area 32 is responsive to the touch of a stylus, the sensing area 32 remains exteriorly exposed within the screen area opening 227 after full assembly of the data terminal 10. An LCD screen assembly 232, including a backing board and LCD address logic, is aligned with and assembled to a locating frame 233 such that circuit devices facing the locating frame 233 become aligned with respective device cavities 234, 235 or 236 in the locating frame 233, as an example. The locating frame 233 is aligned with the main logic board 219. An electroluminescent panel 239 (EL panel 239) is placed between the main logic board 219 and the locating frame 233 just prior to the assembly of the locating frame 233, the LCD screen assembly 232 and the EL panel 239 to the main logic board 219. The assembled elements are combined into a single larger subassembly by becoming sandwiched between the main logic board 219 and the locating frame 233 when the main logic board 219 is fastened to the locating frame 233 with screws 240. A memory module 242 is plugged into a memory connector 243 and held to the main logic board 219 by one or more screws 244 or equivalent fasteners.

A sound transmissive, adhesively coated weather seal 246 is located and attached over a buzzer or speaker grid opening 247 disposed in the upper shell 14 adjacent the screen opening 227. A buzzer 249, which could be a miniature speaker, is mounted to the main logic board 219. When the assembled unit of the main logic board 219 and the locating frame 233 is positioned and fastened into the upper shell 14, the buzzer 249 becomes aligned with and located directly adjacent the weather seal 246 and the buzzer grid opening 247.

A key array 251 of keys 27 and a cursor key cluster 28 is placed into respective key openings 252 and 253 in the upper shell 14. A cursor contact spacer 254 is placed over the cursor key cluster 28. A weather seal 255 peripherally seals the interior of the upper housing shell 14 against moisture or environmental contamination. A key contact board 256 with respective key contacts cooperatively acting in response to a depression of one of the keys 27 or the cursor keys 28 is disposed adjacent the key array 251 and is fastened to the interior of the upper shell 14 with screws 257. A key template 258 becomes adhesively attached to the exterior surface of the upper housing shell 14 adjacent the lower end 20. The key template 258 may be a decorative addition to the exterior of the housing 12, or the template may carry indicia of key functions, particularly when selected ones of the keys 27 become programmed to serve more than one function. A keyboard ribbon cable 259 is communicatively coupled to the main logic board 219.

FIG. 14 is a pictorial composite drawing of major subassemblies as they are ultimately assembled to form the completed data terminal 10, as depicted, for example, in FIGS. 1, 2 or 3. Major subassemblies heretofore described include the assembled upper or top housing shell 14 and the assembled base shell 37 including the I/O board assembly 177. A battery cavity cover 261 is of rectangular shape and sized to fit over the battery cavity 176 in the base housing shell 37. The cover 261 has a plurality of peripherally spaced alignment notches 262 which slidingly engage complementary tabs 263 in the base shell 37. The battery cover 261 is interposed in the final assembly of the data terminal 10 between a battery and the main logic board 219. The cover 261 features a number of resilient tabs 264 which would engage and place a contact pressure on an inserted battery 265 (see FIG. 17) to effectively reduce a necessary insertion clearance for insertion of such battery to a minimum and to stably retain an inserted battery 265 within the battery cavity 176. A guard and spacer block 267 is placed along the upper end 19 into position against the upper housing shell 14 during the attachment of the upper housing shell 14 to the base housing shell 37. The spacer block 267 effectively closes off an edge of the main logic board 219 from accidental damage when the memory card door 42 is opened.

The upper housing shell 14 is attached to the base housing shell 37 by a number of laterally spaced screws 268, by a single screw 269 which extends through the base shell 37 through a boss 270 in the spacer block 267 and into the upper housing shell 14 at the lower end 19 of the housing 12. A second, single screw 271 clamps centrally the two housing shells 14 and 37 at the lower end 20 of the housing 12. A soft and flexible weather seal strip 273 is placed in a peripheral groove 274 which extends along an edge 275 of the base shell 37 that engages and matches with a correspondingly peripheral edge 276 of the upper shell 14. The peripheral edge 275 features a locating ridge 277 with a number of spaced notches 278. The notches 278 are locating notches for the seal strip 273. Correspondingly spaced protrusions 279 molded onto the otherwise smooth seal strip 273 fit into the notches to securely retain the seal strip 273 within the peripheral groove 274. A representative PCMCIA standard memory card 280 may be inserted into the card connector 189 after assembly of the data terminal 10, but before the memory card door 42 at the upper end of the housing 12 is closed. The memory card door 42 and the battery door 41 are quickly opened or removed and re-attached with the respective quarter turn quick release lock assemblies 43.

FIG. 15 shows the memory card door 42 in greater detail. The door 42 is in major structural details identical to the battery door 41, except for its relatively larger size and a switch activator tab 283 and a memory card retention tab 284 which extend from the memory card door 42 inward into the space of the I/O board assembly 177. Both the battery door 41 and the memory card door 42 have a resilient, impact resistant co-molded rubber exterior and integrated door seal 285. Also both the battery door 41 and the memory card door 42 use the same quick release lock assemblies 43. The lock assembly 43 uses an outer quarter turn knob 286. The knob 286 has a stem 287 which protrudes through a bearing aperture 288 in the respective door 41 or 42 into the interior of the housing 12. An O-ring seal 289 peripherally seals off the aperture 288 after the assembly of the knob 286 to the respective door 41 or 42. A spring washer 291 is placed interiorly over the stem 287 and molded flats 292 on the end of the stem 287 engage corresponding flats 293 of a latch lever 294. A screw 295 attaches the latch lever 294 through a flat washer 296 to the stem 287.

FIG. 16 shows details of the memory card door 42 from an exterior direction, showing outer twist members 297 in the knob 286. The twist members 297 are preferably recessed within the confines of the knob 286. The knob 286 is recessed within a knob cavity 298 to protect the data terminal 10 from damage during a fall should the data terminal 10 be impacted suddenly against one or the other of the doors 41 or 42.

Figure 17:
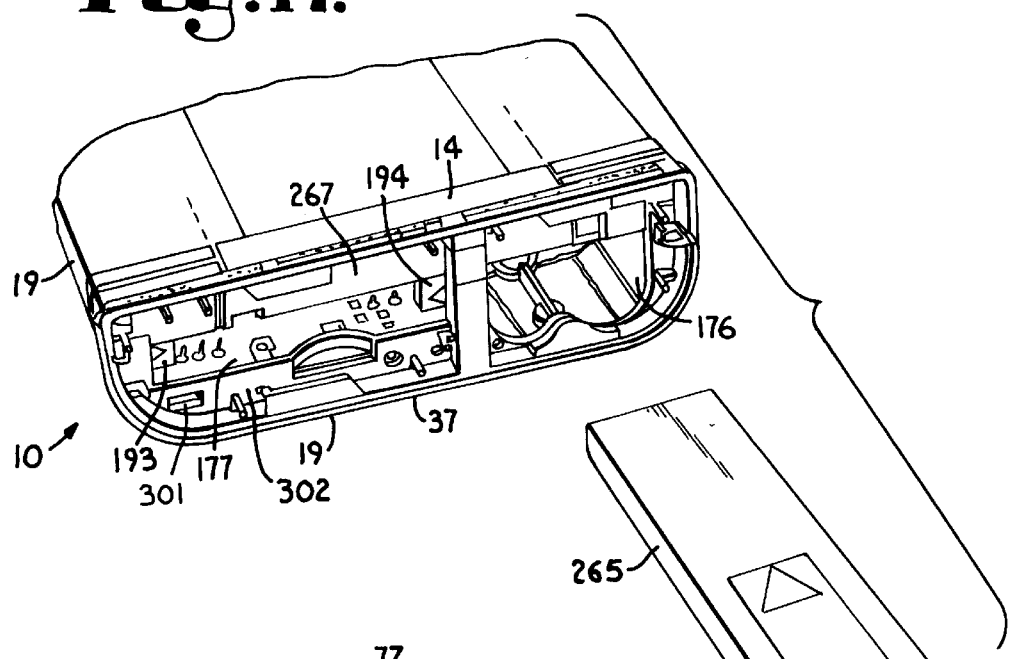
FIG. 17 shows a composite pictorial view of the upper end of the data terminal shown in FIGS. 1, 2 and 3 showing battery and memory card cavities open and showing simplified the shape of a battery about to be inserted into the battery cavity.

FIG. 17 is a composite drawing of the upper end 19 of the housing 12 of the data terminal 10 in combination with a battery 265 about to be inserted into the battery cavity 176. The view of the upper end 19 of the housing is shown with both the battery door 41 and the memory card door 42 removed from their respective cavity openings. The opened upper end 19 of the housing 12 shows the spacer block 267 in position adjacent the upper housing shell 14. Further, an end portion of the I/O board assembly 177 is shown, showing the memory card release buttons 193 and 194 in greater detail. Markings on the release buttons 193 and 194 show that the release button 193 releases a memory card from an upper guide slot while the release button 194 releases a lower memory card. A square aperture 301 in an end wall 302 of the base housing shell 37 allows access for the tab 283 to contact and activate a switch which is physically located on the I/O board assembly 177 to signal that the memory card door 42 has been opened and removed. This signal allows the data terminal 10 to save logical states and assume a sleep mode without loosing data and with the ability to resume operation upon closing of the memory card door 42. Optical, magnetic, inductive or other sensing means are known to detect a movement of a mechanical element with respect to another. The use of the described sensing provision for sensing the removal of the door 42 to request a shutdown mode of the data terminal 10 may consequently be modified accordingly.

Figure 18:
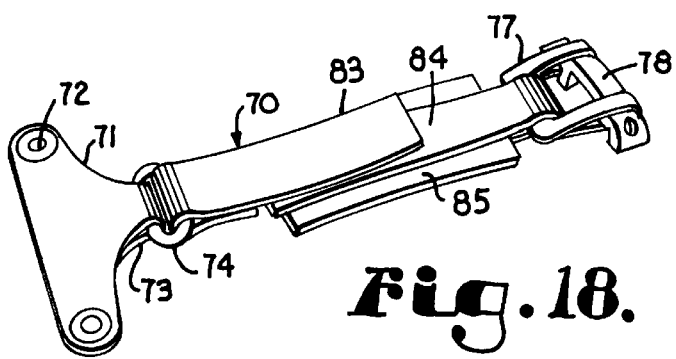
FIG. 18 shows a pictorial view of a handstrap which may be attached to the data terminal as shown in FIG. 2.

FIG. 18 is a pictorial view of the handstrap 70 removed from its attachment to the base shell 37. The handstrap 70 shows the transverse upper attachment end 71 with the two transverse attachment points 72. The strap loop 73 of the attachment end 71 retains the described strap ring 74. The strap 76 is inserted and adjusted in length by pulling more or less of the length of the strap 76 through the strap ring 74. The strap 76 terminates in the bifurcated or forked strap loop 77 which may be placed as shown over the holder bracket 78 with the desirable results as described herein. The holder bracket 78 may be quickly fastened or removed from the data terminal 10 by the described screws 79 or equivalent fasteners. When the strap 76 is looped through the ring 74 it may be attached to itself via convenient hook and loop fasteners in the strap regions 83 and 84. The length of the fastening area 84 is chosen for an effective length adjustment range of the handstrap 70. The hand pad 85 provides cushioning for an operator's hand when inserted between the handstrap 70 and the data terminal 10.

Figure 19:
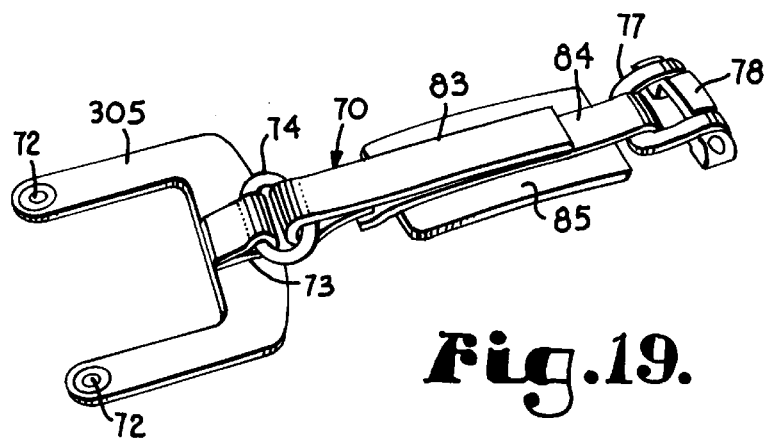
FIG. 19 shows a pictorial view of a handstrap which may be attached to the data terminal in lieu of the handstrap shown in FIG. 18, the handstrap showing an accessory pod straddling configuration.

FIG. 19 shows the handstrap 70 which is identical in function to the handstrap 70 described with respect to FIG. 18, but which includes a modified transverse upper end attachment 305 in lieu of the transverse end attachment 71. The attachment points 72 remain nominally spaced as shown in FIG. 18. Also the strap loop 73 holds the strap ring 74. The transverse attachment 305 is, however, bifurcated to straddle an accessory pod (not shown), when an accessory pod, such as the accessory pod 30 in FIG. 3, is used in lieu of the multi-purpose grip plate 52 depicted in FIG. 2. If desired, the handstrap 70 as depicted in FIG. 19 may be used in conjunction with either the accessory pod 30 or the multifunction grip plate 52.

Figure 20:
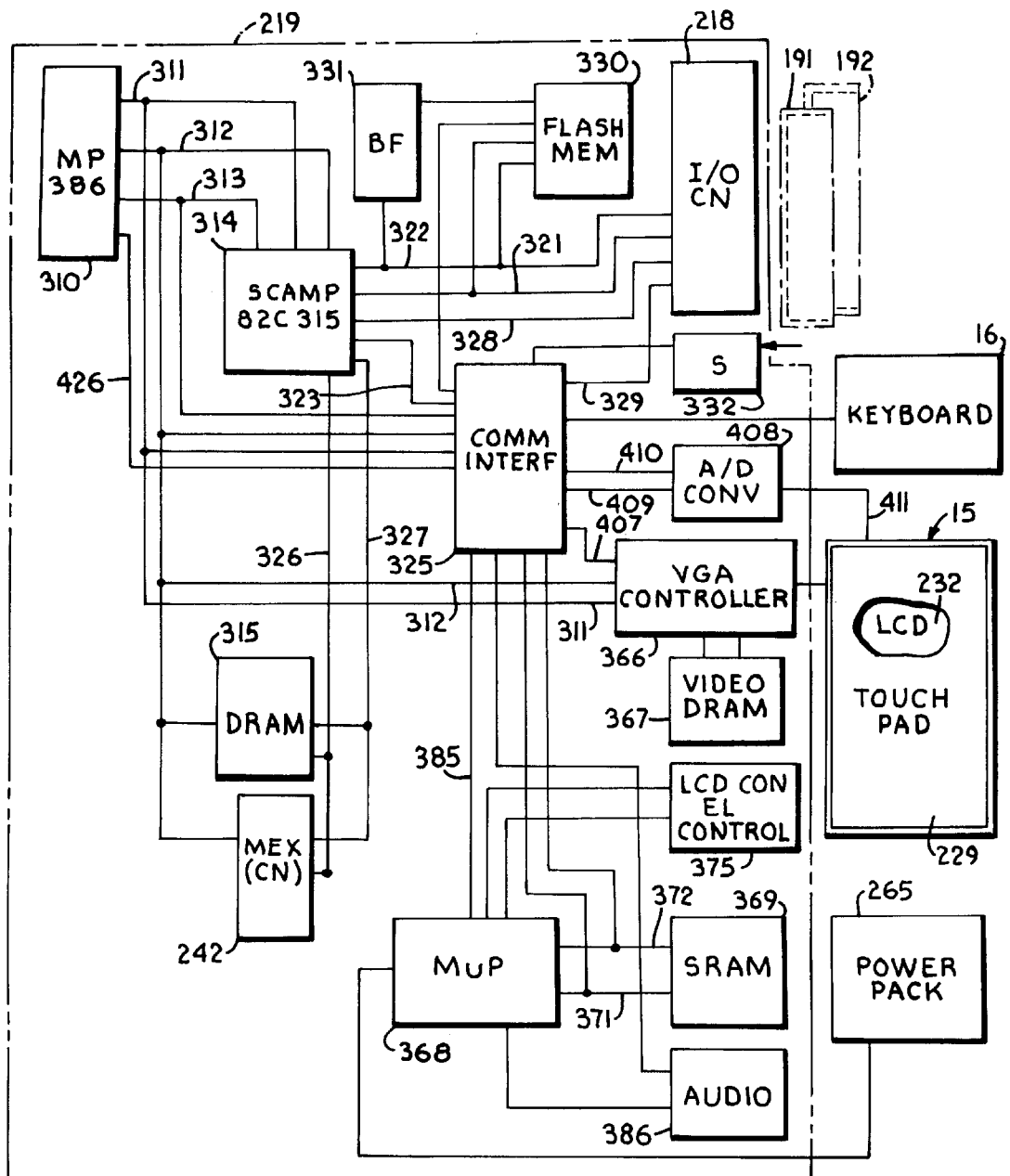
FIG. 20 is a diagram of electronic circuits or functions which operate the data terminal in accordance with an embodiment of the invention.

FIG. 20 is a diagram of electronic functions which operate and control the operation of the data terminal 10 in accordance herewith. The functions depicted are essentially found on the logic board 219. A preferred microprocessor device is an AMD 386 microprocessor 310 (MP 386). An address bus 311, a data bus 312 and a control bus 313 couple the microprocessor 310 to a computer device 314, referred to as a "SCAMP" (SCAMP 82C315). The data bus 311 further couples the microprocessor 310 to a DRAM memory device 315 (DRAM). The memory device 242 is removably mounted to the logic board or main circuit board 219 itself through the typical sub-circuit connector socket 243, not separately shown in FIG. 20. The connector socket 243 is a typical device socket which may be commercially obtained to couple a subcircuit, such as the memory extension board 242 ("M EX (CN)") to the main circuit board 219.

The SCAMP device 314 is coupled by shared data and address buses 321 and 322, respectively, to the I/O board assembly 177, also referred to as an I/O connector board 177. Connection to the I/O connector board 177 is made through the I/O connector 218 and is schematically shown as a connecting function 218. The SCAMP device 314 is further coupled through a control bus 323 to a communications interface device 325 ("COMM INTERF"). Row and column address buses 326 and 327 of main application memory devices 315 and 242 are addressed through the SCAMP device 314. The I/O connector or connection 218 interfaces with the application microprocessor 310 via the SCAMP device 314 and the communications interface device 325. Consequently, the connection 218 is further coupled to the SCAMP device 314 by a local address bus 328 and to the communications interface device 325 by an interrupt request bus 329. Flash memory 330 ("FLASH MEM") contains initial start-up control instruction for the applications microprocessor 310. The flash memory 330 is coupled through the SCAMP device 314 via the shared data and address buses 321 and 322, respectively, and may include a buffer 331 (BF), coupled to the address bus 322.

Figure 21:
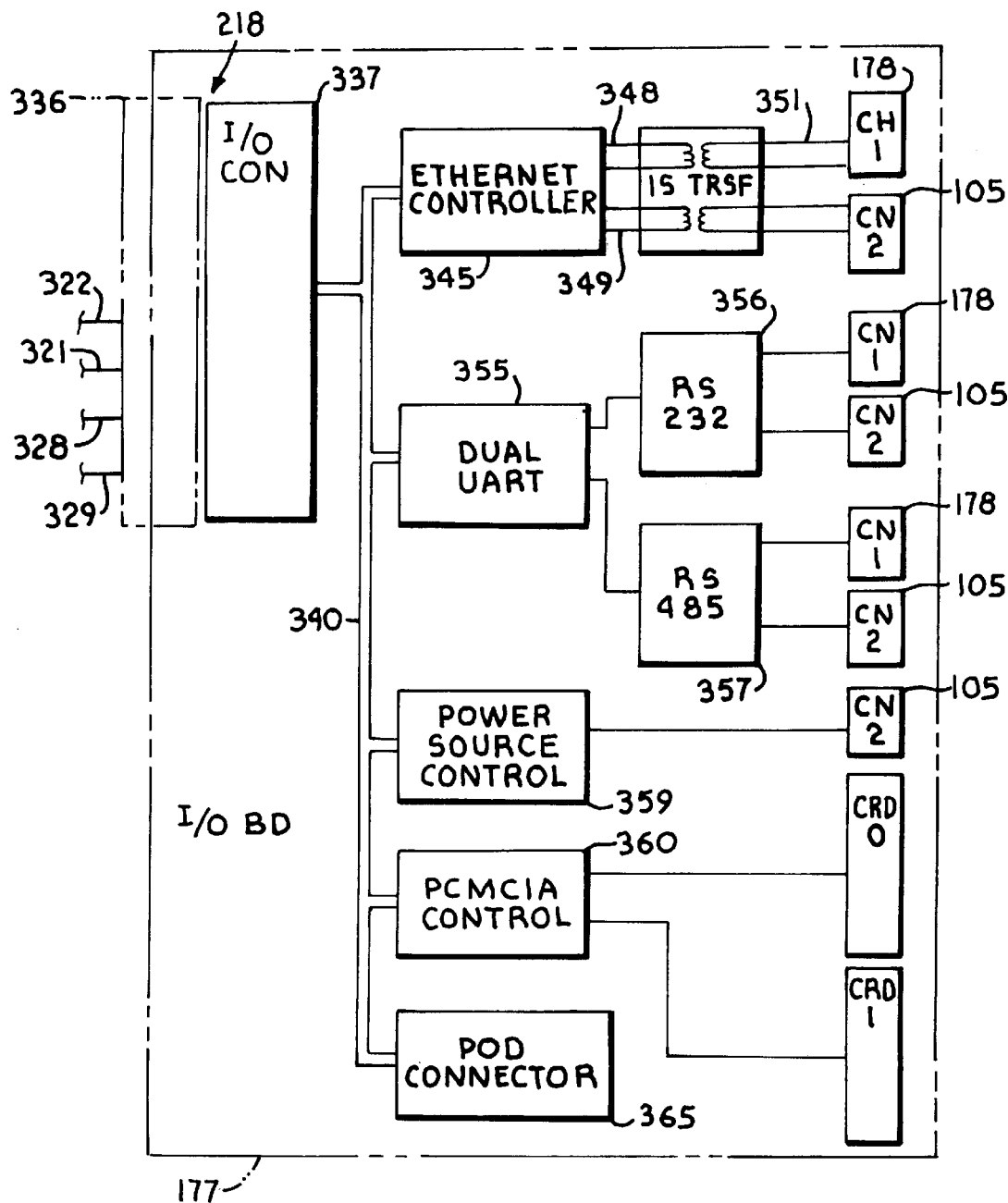
FIG. 21 is a diagram of electronic functions of an input-output function board which may be coupled to an input-output function connector shown in FIG. 20, for example.

Input and output functions of the I/O connection 218 are best explained in brief reference to FIG. 21.

FIG. 21 depicts functional elements which are mounted on the special input-output function interface board 177 ("I/O BD"), further referred to as I/O board 177. An advantage of the use of the I/O board 177 as an addendum to, but as a separate structural element from, the main circuit board 219, for example, is an increased ease of assembly and a promotion of modular concepts. A use of modular concepts permits the data terminal 10 to be adapted to special uses. In reference to FIGS. 20 and 21, the preferred functional layout of a combination of the main circuit board 219 and the I/O board 177 shows that substantially all internal operational functions of the data terminal 10, those which are expected to remain the same for most, if not all, applications, are supported by the main circuit board 219. On the other hand, input-output functions may vary among different special use applications of the data terminal 176. The less permanently defined input-output functions are therefore found on the I/O board 177. The data terminal 10 may therefore undergo a basic functional modification by the removal of the I/O board 177 for a different I/O board with different input-output functions. Components on the main circuit board 219 need therefore not be changed. However, with changed input-output functions and parameters, a control program which would be resident in the flash memory 330 may need to be updated to account for changes in operating default settings of now different input-output functions as provided by a different I/O board.

Physically and communicatively, the I/O board 177 is coupled through the I/O connection 218 to the main circuit board 219. The connection 218 may be established between mating I/O connectors 336 and 337 mounted, respectively, to the main circuit board 219 and the I/O board 177. The respective I/O connectors 336 and 337 couple and extend the data and control buses 321 and 322, the local address bus 328 and the interrupt request bus 329 to the I/O board 219. The data and control buses 321, 322, the local address bus 328 and the interrupt request bus 329 are depicted in FIG. 21 as an I/O signal and control bus 340.

A basic version of the I/O board 177 is preferred to include input-output functions as shown in FIG. 21. An Ethernet controller 345 is a commercially available Ethernet controller device. The Ethernet controller 345 is communicatively coupled through the I/O signal and control bus 340 to the data terminal 10. Communication between external devices and the data terminal 10 is obtained through a 28-pin data connector 178 and a bank of coupling elements, such as surface contact assembly 105 of the data terminal 10. Signal pairs 348 and 349 from the Ethernet controller 345 are preferably coupled through an isolation transformer device 350 to external communications couplers, such as to the data connector 178 or to the surface contact assembly 105. It has been determined that parallel connections to both the typical 28-pin type communications connector 178 and surface contacts, such as the surface contact assembly 105 (see, for example, FIG. 2) increases the usefulness of the data terminal 10. Consequently, communications leads 351 and 352 on an external side of the isolation transformer 350 are coupled to respective terminal contacts of both the 28-pin connector 178 and of the bank of surface contacts 106.

A second desirable communications controller on the I/O board 177 is a Dual UART device 355. The Dual UART (Universal Asynchronous Receive and Transmit) device 355 is coupled internally of the data terminal 10 to the I/O signal and control bus 340 and for external communications to respective RS 232 and RS 485 control circuit devices 356 and 357, respectively. In furtherance of advantages obtained through a dual coupling function via both the connector 178 and surface contacts 106, standard connections of the RS 232 and RS 485 devices, 356 and 357, are also contemplated to be coupled to designated control and data terminations on the 28-pin connector 178 and respective ones of the surface contacts 106. The portable data terminal 10 may typically not be regarded as the type of device the usefulness of which may be enhanced by linking provisions to communication networks such as Ethernet. However, it has been discovered that a full function of the data terminal 10 is implemented only when an efficient operation of collecting data at the working level of a complex data system is supplemented by equally efficient communications with the data system. In furtherance of this, Ethernet capability is found to provide a communications link of significance. Ethernet may be used, to give but one example, for data exchange with a data system external to the data terminal 10, during docking periods, for example, when the batteries 265 are being recharged. External power may temporarily be applied to the data terminal 10 while the data terminal is located in the docking device 110 (see FIG. 4). Such external power may be used to conserve power consumption from the power pack 265 and to recharge the power pack 265 as needed.

A battery charging control circuit 359 is desirably located on the I/O board 177 in that battery charging connections are made through selected terminations of the surface contacts 106. Other external connections, such as any convenient power plug, may of course be provided in addition to designated ones of the surface contacts 106. Smart battery charging control circuits 359 are known and are desirably used within the data terminal 10 itself to provide protection to the data terminal 10 from damage due to improper charging procedures or failure of controls that may otherwise be available in standard battery recharging apparatus (not shown). The control circuit 359 has the function of limiting the magnitude of a charging current that may be admitted to batteries of a power pack 265, for example.

The I/O board 177 is also found to desirably contain a communications control interface device 360 to one or more PCMCIA card slots, preferably the two card connectors 191 and 192, as described above with respect to FIG. 11. Though PCMCIA cards may serve to provide added storage capacity to apparatus, such as the data terminal 10, known diverse uses for PCMCIA cards most properly allow these cards to be considered data input and output devices, rather than primarily data storage devices. In reference to FIG. 20, a switch 332 may be depressed to recognize a special use card in the respective card slot 191, for example, such that the flash memory 330 on the main circuit board 219 may be updated whenever the presence of a special memory card is detected by the switch 332.

The I/O board 177 further features a pod connector 365, through which connection is made to the respective accessory panel or pod 30 and to any respective data collection or communications device located therewith. The pod connector 365 is communicatively coupled to the I/O signal and control bus 340, just as the Dual UART device 355 and the Ethernet controller 345. The accessory pod 30 may, for example, contain the described bar code scanner 29. The accessory pod or panel 30 may instead house data communications apparatus, such as an RF transceiver, or a modem. The accessory pod 30 may be controlled internally by a microprocessor circuit of its own for processing data in accordance with the function of the respective accessory device, the processed data then being transferred to the data terminal 10 via the I/O signal and control bus 340. However, data flow between the data terminal 10 and the accessory pod 30 is preferably controlled by the data terminal 10 by control signals from the main circuit board 219 applied via the I/O signal and control bus 340.

Referring back to FIG. 20, the depicted circuit functions show certain changes and improvements over the circuit functions described in the prior application, Ser. No. 08/048,873, filed Apr. 16, 1993, while retaining the inventive features disclosed therein. Simplifications include a deletion of an optional ROM device, in that the flash memory 330 includes the BIOS for operating the main logic board 219. Also, a memory refresh operation is advantageously executed by the SCAMP device 314 and is not separately shown. An advantageous change provides for a VGA controller device 366 to be addressed directly by the applications microprocessor 310, rather than through the SCAMP device 314, as shown by the routing of the address and data buses 311 and 312, respectively. Video DRAM 367 is coupled directly and interacts directly with the VGA controller 366.

The communications interface device 325 is linked directly with address, data and control buses to both the applications microprocessor 310 and a maintenance microprocessor 368. Static RAM 369 is coupled through respective address and data buses 371 and 372 to the maintenance microprocessor 368. The maintenance microprocessor 368 controls generally maintenance functions such as an LCD contrast control function 375 ("LCD CON -EL CONTROL") which further represents an EL panel backlighting control for the LCD screen 15. A further control function for the maintenance microprocessor 368 is to monitor the remaining charge or state of charge of the battery or power pack 265. The maintenance microprocessor 368, in functioning as a relatively slow operating control microprocessor, obtains its reset and start up code through the respective maintenance data bus 372 as addressed by the respective maintenance address bus 371 from the static ram device 369. The maintenance microprocessor device 368 consequently retains its operating code independently of battery voltage levels. In case of memory failure, the maintenance memory 369 may be renewed or rewritten by the applications microprocessor 310 pursuant to programs stored in the flash memory 330, or as further updated via the PCMCIA special functions available through the connector 191 and a special updating card. The maintenance microprocessor 368 further shows an interrupt request bus 385 which is used in the power maintenance function to communicate possible alarm or interrupt conditions between the microprocessor 368 and the communications interface circuit 325. An audio circuit device 386 ("AUDIO") is shown coupled directly to the maintenance microprocessor 368 and the communications interface device 325.

A control bus 407 couples the communications interface device 325 to the VGA controller 366. The switch 332 is manually activated instead of directly by a special memory card, though such an interaction is considered to be an option. The switch 332 may now be operated manually in conjunction with an ON/OFF switch of the data terminal 10 when a special memory card is present and the memory address function is to be altered through the memory card. Though an active pen operated digitizing array may be used, the described touch sensitive pad 229 is preferred as an overlay over the LCD screen 15. An analog-to-digital signal converter 408 (A/D CONV) is coupled to the touch sensitive screen or pad 229. A touch screen control line 409 leads to the converter 408, and digital signals are obtained via the data bus 410, as obtained from an analog voltage output via line 411 from the touchpad 229

Figure 22:
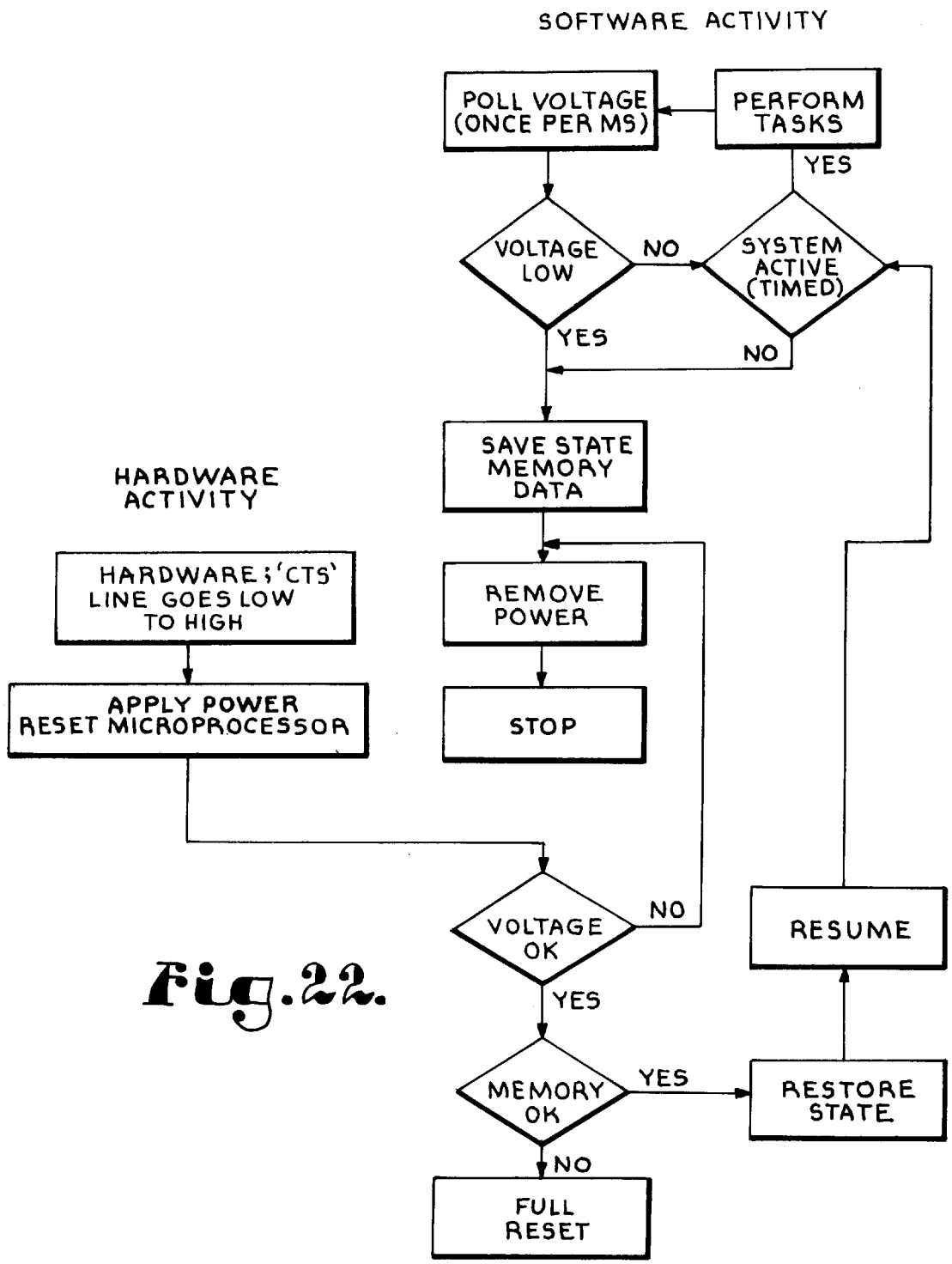
FIG. 22 is a control logic flow diagram of a sequence to be followed during power up or power down operations of a data terminal in accordance with an embodiment of the invention.

FIG. 22 is a flow chart of an interaction between both a control program as it may reside in memory of the data terminal 10, and certain circuit states of the circuit functions of the circuit board 219, for example. The operation of the data terminal 10 is comprised of separate functions of executing application programs or "performing application tasks", such as collecting, processing or communicating data messages, and a continuous power management procedure. Pursuant to the unique power management procedure which is enabled by the described circuit function, power to the data terminal 10 may be shut down any time the data terminal 10 is not in use, or during any of a number of alarm or defect conditions. Such defect condition may occur when the operating voltage falls below a desirable minimum voltage, or when an operator seeks access to the data terminal 10 in a manner which may cause an inadvertent power failure.

Referring specifically to FIG. 22, hardware activity may activate the data terminal 10, for example, by an operator "turning on" the data terminal 10. When a "CTS" (clear to send) signal goes from low to high, power is applied and the microprocessors 310 and 368 may be reset. At that time the software or the control functions of the data terminal 10 take over. The voltage is checked and would be compared to a preset minimum (or even maximum) voltage. If the voltage check is "OK", a memory check is performed. If the memory check is passed, all states of the data terminal 10 prior to shut down are restored ("RESTORE STATE"). Thus, whatever operation may have been performed prior to shutdown, the data terminal 10 becomes enabled to resume that operation. Thus, unless other operations are initiated, the ("RESUME") step is executed. If a memory check fails, a full reset will be performed.

Further in reference to FIG. 22, a timed activity monitoring function may be executed by the maintenance processor 368 (see FIG. 20). For example, if there is no activity within ten seconds, the states of the data terminal 10 are again saved, as well as memory and data states, and the data terminal 10 is powered down, at which time all software functions necessarily stop because of lack of power. It now takes mechanical or hardware action, as explained, to again power up the data terminal 10. However, because all states are saved, operation of the data terminal 10 is resumed at the point of operation at which power down operation was initiated.

If there is system activity, or if there has been system activity within a preset monitoring period, such as the ten-second period, the data terminal 10 will continue to perform its tasks. Voltage levels are polled in preferred intervals. A preferred interval is once every millisecond or 1000 times per second. This polling activity is an activity performed by the maintenance microprocessor 368. As soon as a low voltage condition is detected, the shut down sequence is initiated. The active states are saved to shadow ram, and the data terminal 10 is powered down by removing power. Further activity stops, but the most recent active states of all devices including the I/O states, are preserved. Thus, when an operator pushes a designated keyboard function switch, for example, the operation of the data terminal 10 may be resumed.

Figure 23:
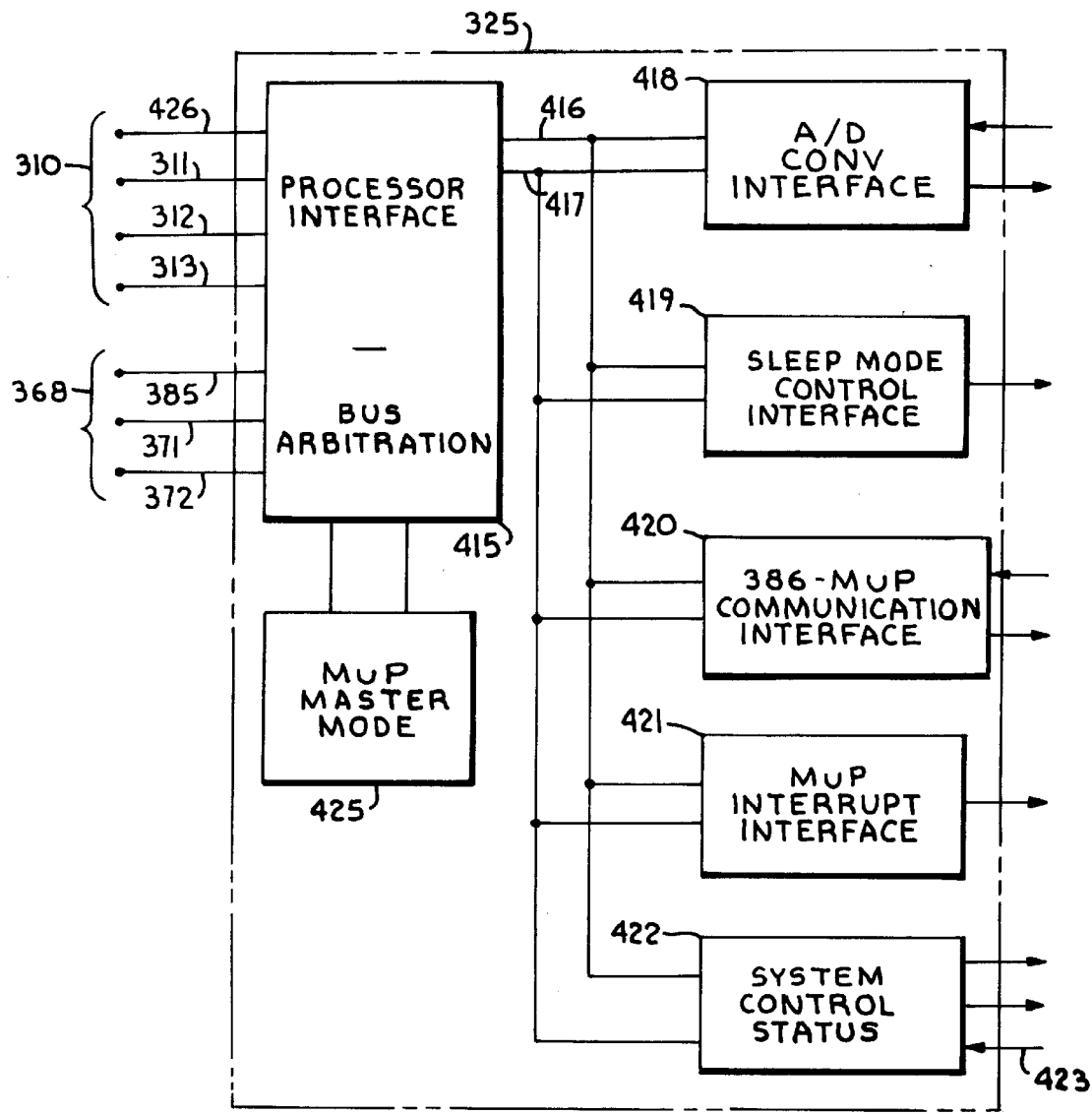
FIG. 23 is a diagram of electronic functions of a communications interface circuit block shown in FIG. 20.

FIG. 23 shows preferred functions of the communications interface circuit 325. The respective address, data and control buses 311–313 from the microprocessors 310 and 368 lead into a processor interface and contention resolution circuit 415. From the interface 415, an address bus 416 and a data bus 417 provide for selective addressing and operation of an A/D converter function 418, a sleep mode function 419, the control 420 of interaction between the applications and maintenance microprocessors 310 and 368, the maintenance microprocessor interrupt control 421 and a general system control function 422 which addresses and operates the various other functions as hereinbefore described, and through which status data may be received via status bus 423. The communications interface circuit 415 is further improved with a maintenance processor master mode function 425. The master mode function 425 may be triggered by a signal from the communications interface circuit 325 to the applications microprocessor 310 to tri-state or neutralize output signals from the microprocessor 310. The tri-stating signal is applied via control line 426, effectively rendering the applications microprocessor 310 non-functional. The procedure may be used in conjunction with a special memory card on start up, by depressing the switch 332 shown in FIG. 20 in conjunction with powering up the data terminal 10. The procedure may be used when the BIOS program residing in the flash memory device 330 (FIG. 20) has become defective and is to be restored, or when a new BIOS is to be loaded into the flash memory device 330. Accordingly, during such controlled start up, the maintenance microprocessor 368 takes over the setup function of the data terminal, acting in place of the applications microprocessor 310 to cause the microprocessor 310, upon a further reset command, to address the special memory card from the card slot 191, for example, instead of fetching instructions from the flash memory 330.

Figure 24:
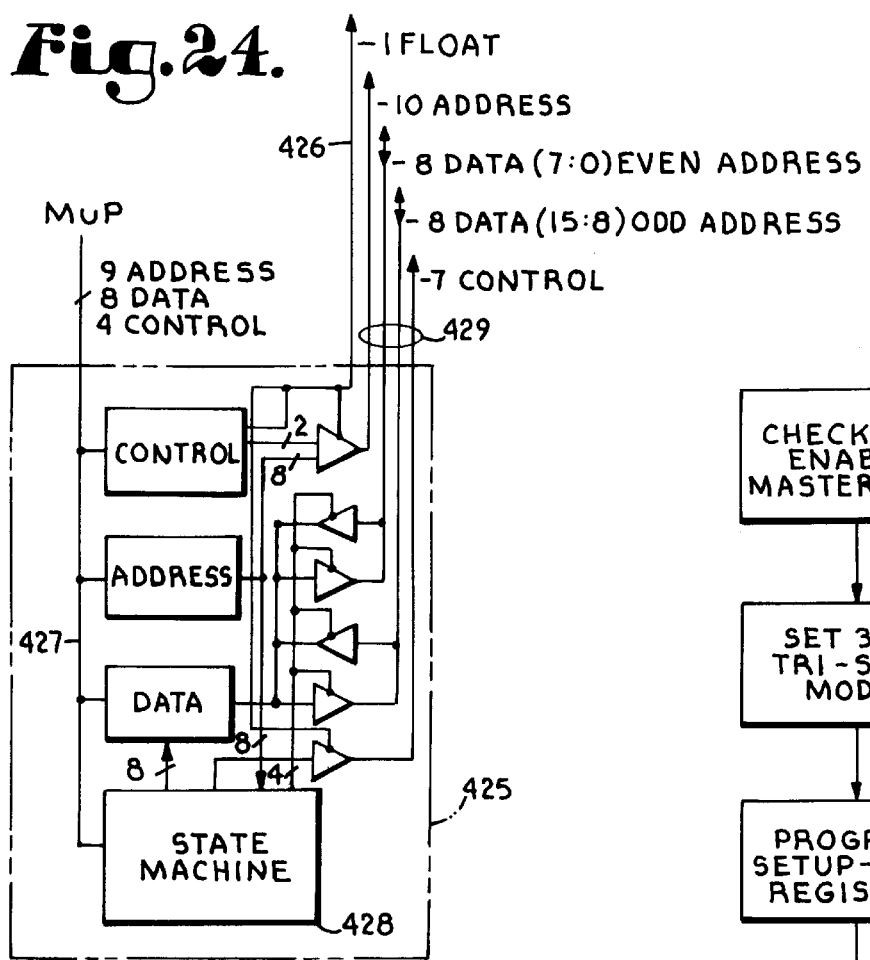
FIG. 24 is a diagram of electronic routing within a control processor master mode circuit function of the communications interface circuit block depicted in FIG. 23.

FIG. 24 shows details of the master mode function 425. Control, data and address codes from the maintenance microprocessor 368 through bus 427 are converted via respective control address and data communications functions and through a state machine 428, though at the rate of the microprocessor 368 through output buses 429 as if stemming from the applications processor 310.

Figure 25:
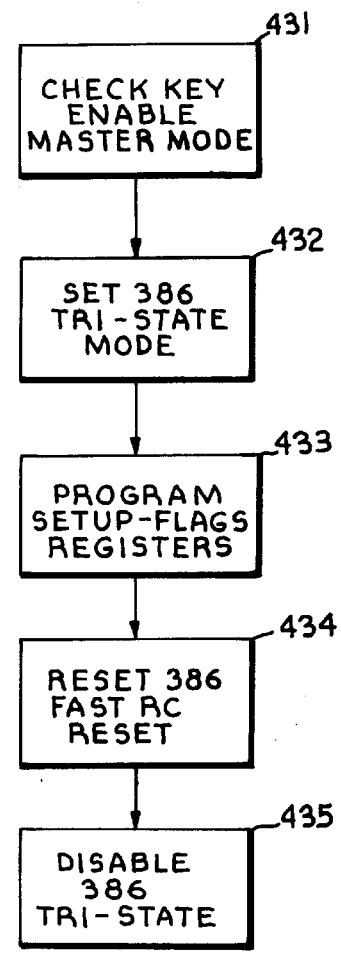
FIG. 25 is a sequencing diagram of functions executed by a control processor operating in the control processor master mode upon its initiation through the communications interface circuit block.

FIG. 25 shows a sequence diagram whereby in step 431 the communications interface 325 checks the special key and enables the master mode just described. In step 432 the microprocessor 310 is disabled by the tri-state mode via a signal over control line 426. In step 433, the microprocessor 368 takes over as described to set flags and registers to direct communications of the microprocessor 310 to the special PCMCIA card at the slot 191, for example. In step 434, the microprocessor 310 is reset, and while reset is taking place, the maintenance or control microprocessor 368 disables, through step 435, the signal at 426, returning the applications microprocessor 310 to its normal operation. However, because of the specially set flags and registers, the SCAMP device 314 directs the request for data from the microprocessor 310, instead of to the flash memory 330, to a PCMCIA controller 436 located on the I/O board 177.

Figure 26:
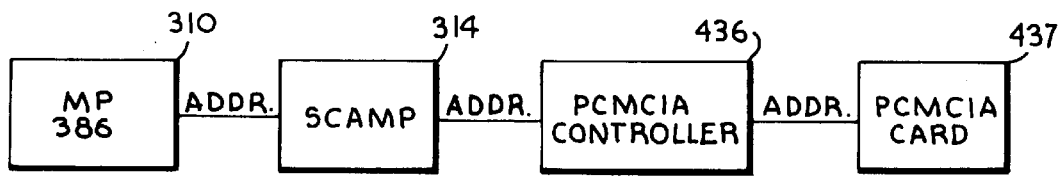
FIG. 26 is a block diagram showing a routing of address codes within the data terminal upon a completed setup via the control processor master mode function.

FIG. 26 shows a data flow during such altered address states. The microprocessor 310 bypasses the flash memory 330 and, instead, sends and receives data and address codes through the SCAMP device 314 and respective buses 321 and 322 and through the controller 436 from a special memory card 437.

Figure 27:
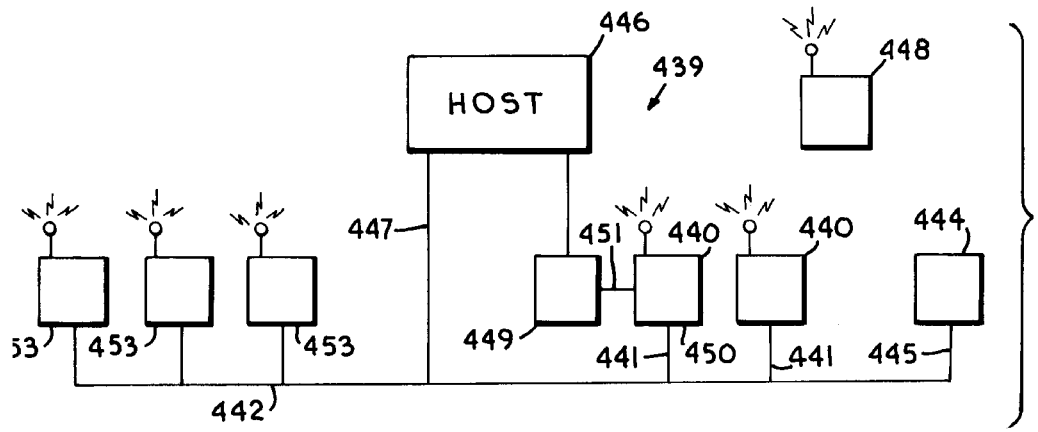
FIG. 27 is a schematic representation of connectivity between various components of a system using the data terminal, in accordance with the present invention.

As an example of a network system 439 utilizing the present invention, each of one or more 902 MHz base stations 440, such as a Model No. RB4030E as provided by Norand, has a connection 441 in direct communication with an Ethernet LAN 442, as shown in FIG. 27. An access control 444 for the 902 MHz band radios, such as a Model No. RC4030E as provided by Norand, also has a connection 445 in direct communication with the LAN 442. Alternatively, one of the base stations 440 may be combined with the access controller 444 into a single unit, such as a Model No. RBC4030E, as provided by Norand. The access controller 444 manages the radio portion of the network system 439 and provides access to a host 446 and its network through connection 447. The system 439 may also include one or more wireless base stations 448. The described arrangement is in accordance with wired LAN connectivity approaches. The LAN 442 is the radio backbone for the base stations 440, but when a flagship access controller 449, such as a Model No. RC3250 as provided by Norand, is needed, it is linked to a closest one of the base stations 440, such as the base station 440 designated by the numeral 450 in FIG. 27, by an RS485 line 451. A 2.4 GHz radio 452 is contained in a base station 453. In addition, another one of the radios 452, including antenna, is contained on a PCMCIA Type II card that fits into one of the PCMCIA slots of a terminal 454, as hereinbefore described.

For example, the radio 452 operating in the 2.4 to 2.4835 GHz spread spectrum band, such as a Norand 2.4 GHz band radio, uses a 1 MHz size data transmission channel that hops over 82 channels with an effective raw data rate of 1 Mbps; radiating at 65 milliwatts of power, it can typically cover from 25,000 to 70,000 square feet with a process gain of 10 dB. The relatively low power output is a consequence of limits placed on the standards for PCMCIA cards. This standard limits power on any PCMCIA card to 100 mW. This 2.4 GHz Band radio on a Type II PCMCIA card is structured to conform to the OSI seven-layer communications model.

Figure 28:
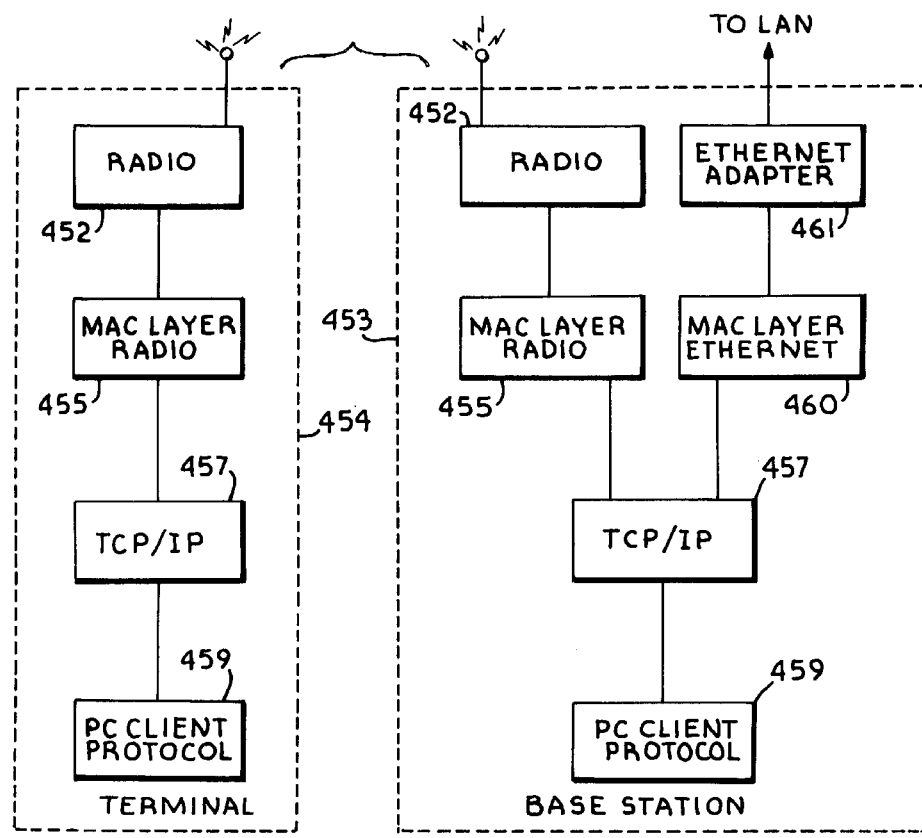
FIG. 28 is a logical representation of communication layers for a 2.4 GHz band radio network in accordance with the present invention.

FIG. 28 is a logical representation of communication layers of the 2.4 MHz band radios 452 in the network system 439. The radio 452 and MAC sub-layers 455 are incorporated on the aforesaid radio card, together with an interface 457 to the remaining layers of software that are incorporated into the operating systems of the terminals 454 and the base stations 453. The upper software layers deal with protocols 459, such as routing and application interface issues. The base stations 453 also have physical and MAC sublayer support 460 and adaptors 461 for connecting to the Ethernet LAN 442. The MAC sub-layers 455 provide an asynchronous data delivery service that is equivalent to the service provided by Ethernet. It is a best effort datagram delivery service with low delay that readily supports typical bursty LAN applications, such as file access, client/server applications, printing, and e-mail.

The MAC layer 455 operates on a positive acknowledgment protocol. Each time a data packet is sent, the sending station expects to receive an acknowledgment packet from the receiving station indicating that the data packet was received without error. If the acknowledgment doesn't arrive within a specific short time interval, the sending station retransmits the data packet. This process is repeated until the data packet is acknowledged to have been received successfully, or a retransmission limit value is exceeded. These retransmissions are completely transparent to the host computer 446 and upper layer software.

Since multiple terminals 454 and base stations 453 will be sharing the radio medium, and since retransmissions due to collisions (two radios sending data at the same time) are wasteful on the power supply, the radio system employs a virtual collision detect scheme to minimize collisions. Another reason for collision detection is to conserve bandwidth. If a collision occurs during a data packet transmission, the radio bandwidth is occupied unproductively for as long as the time it takes for the longest colliding data packet to complete transmission. To avoid collision, and to resolve contention for the bandwidth, the first packet that a sender transmits is a "request to send" packet. When the receiver sends a "clear to send" packet, the sender is reasonably assured of having the radio channel clear to send the actual data packet(s). Since the "request" and "clear" packets include the length of the actual data packets, other devices on the network 439 are aware of how long the radio bandwidth will be occupied, and will not even attempt a "request to send" transmission during that period. With this approach, only "request" packets are subject to routine collisions. However, since they are very small sized packets, the time and power wasted is minimal.

Any number of the terminals 454 and the base stations 453 can join the radio network 439 automatically. When security is employed, all devices attempting to gain access to the Ethernet LAN 442 via one of the base stations 453 are required to pass a station authentication process. Accepted stations are given a key with which they decode the encrypted data transmissions they receive. Not only is roaming supported, but each of the base stations 453 can employ a different hopping sequence. Thus, for each co-resident ones of the base stations 453 with a different hopping sequence that is added to the network 439, an additional 1 Mbps capacity is added, provided that the terminals 454 are allocated evenly among the different hopping sequences.

FIG. 29 shows an oblique, perspective underside view of the portable data collection terminal 10. The accessory pod 30 connected to the underside of the portable collection terminal 10 includes the scanner 29, as hereinbefore described. Again, the accessory pod 30 has a handgrip portion 470 (FIG. 30) has a width dimensioned less than the width frontal side of the portion containing the screen 15 (FIG. 1); thus underside lateral margin portions 37A (FIG. 29), 37A, 37B (FIG. 30) are present along with handgrip side walls 470A (FIG. 29), 470A, 470B (FIG. 30) for offsetting the handgrip bottom, defined by bottom portions such as 30A (FIG. 29), 30A, 30B (FIG. 30), from the lateral margins of the display screen, such that the screen is shielded from accidental contact by a user when holding the handgrip defined by pod 30 (FIGS. 29, 30) with handgrip portion 470 (FIG. 30). The accessory pod 30 includes a pod wall 471 having at least one activation switch 472 that is adapted to activate a device contained in the accessory pod 30, or, in the example shown in FIG. 29, the scanner 29.

The pod wall 471 is disposed generally transversely to the handgrip portion 470 and extends generally outwardly from, the housing 12. The switch 472 is disposed near an end 473 of the pod wall 471 such that a user gripping the handgrip portion 470 can curl a thumb or finger into position to depress the switch 472. Preferably, the switch 472 comprises a diaphragm-type switch. The scanner 29 can be activated by simply depressing and holding the switch 472 while using the scanner 29 and then releasing the switch 472 to deactivate the scanner 29 upon completion of the desired task. Alternatively, the switch 472 may be of the type whereby the switch 472 is depressed and released to activate the scanner 29 and then depressed and released a second time to deactivate the scanner 29.

FIG. 30 shows a longitudinal and perspective underside view of the portable data collection terminal 10 showing the pod wall 471 having two of the activation switches 472. As before, each of the activation switches 472 is disposed near the ends 473 of the pod wall 471 such that one of the switches 472 is operable by either the user's finger or thumb and the other one of the switches 472 is operable by the other of the user's thumb or finger. In that event, the switches 472 are connected in parallel to perform the same operation. It is to be understood that, for some application, it may be desireable to use one of the switches 472 to perform one operation with either the user's finger or thumb and the other of the switches 472 to perfrom another operation with the other one of the user's thumb or finger.

Figure 31:
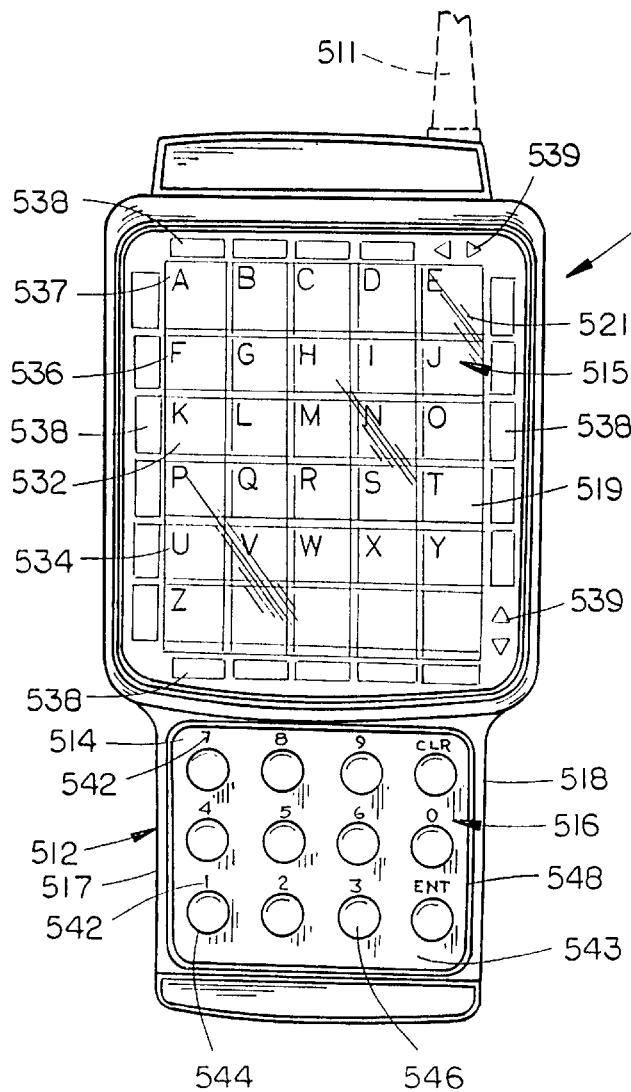
FIG. 31 is a frontal view of a data terminal showing a touch sensitive display screen in combination with a keyboard in accordance with an embodiment of the present invention.
Figure 32:
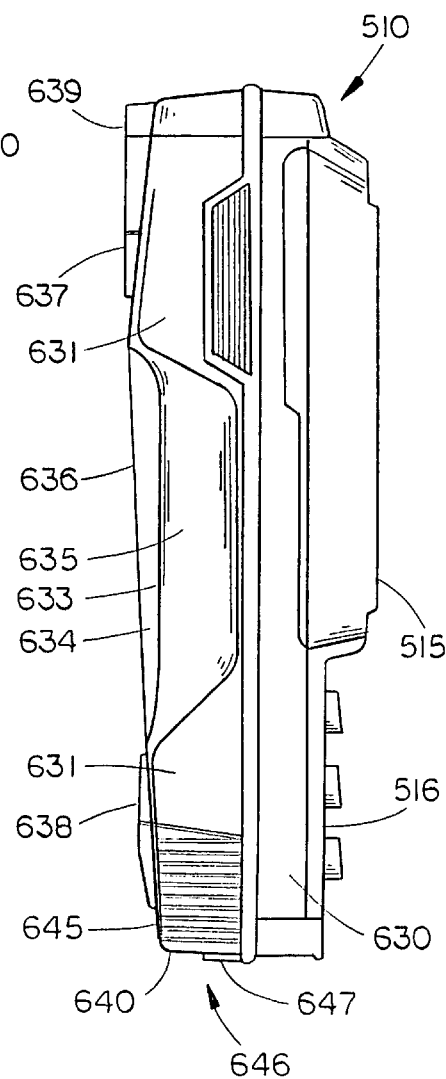
FIG. 32 is a side view of the data terminal shown in an upright position as in FIG. 31 and showing frontal and rear shells of a housing of the data terminal.
Figure 33:
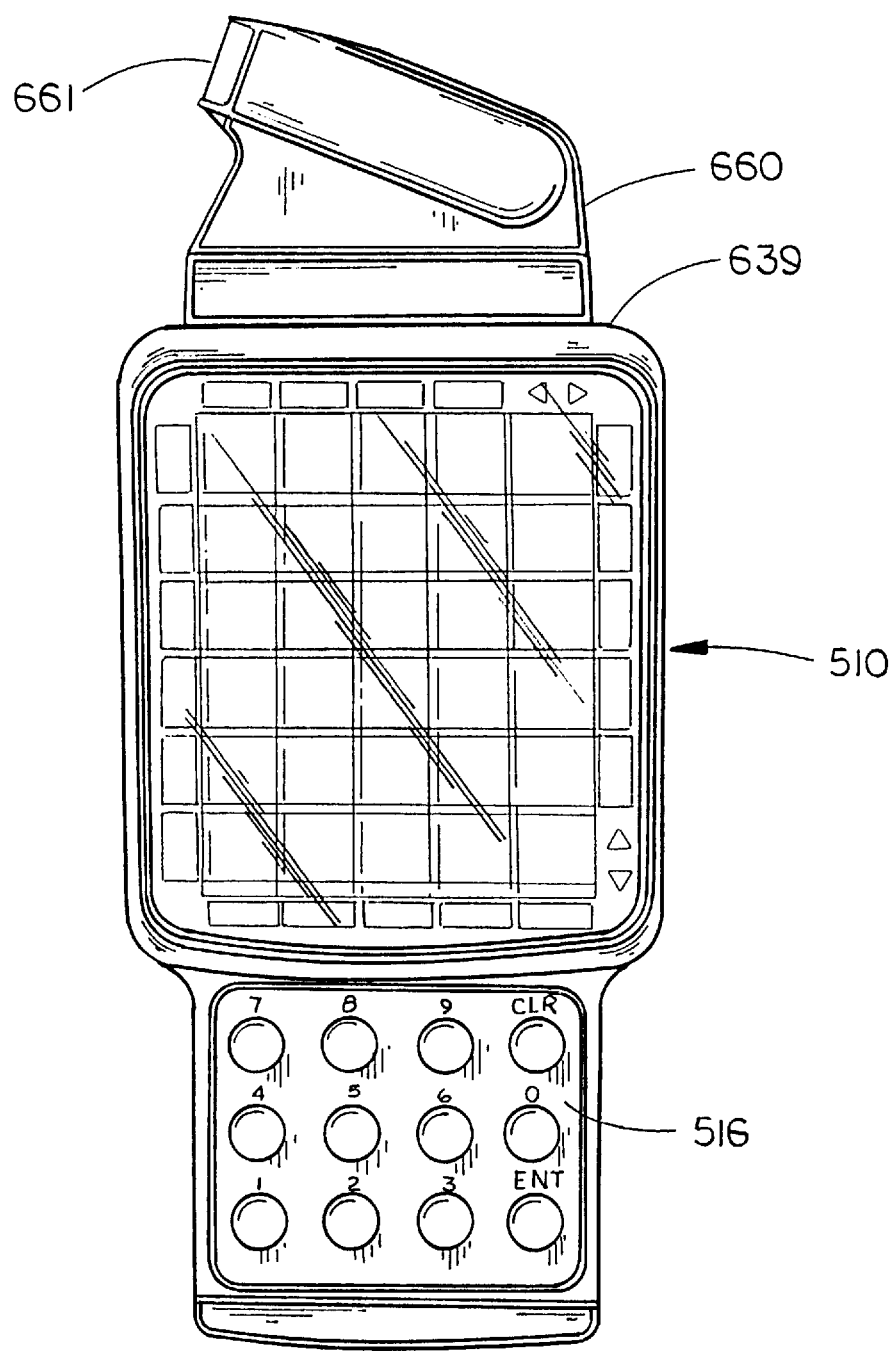
FIG. 33 is a frontal view of the data terminal shown in FIG. 31, and further modified with a scanner module, such as a laser scanner module for reading bar codes.

Description of FIGS. 31–33

In reference to FIG. 31, there is shown a frontal view of a portable data collection terminal or data terminal which is designated generally by the numeral 510. The data collection terminal 510 is a handheld, portable unit, which is understood in the art as being powered by a self-contained power source. Such a portable data terminal 510 may operate in what is referred to as a batch mode in which data are collected by and stored within the data terminal 510 to be transferred to an alternate data processing unit or host computer (not shown) in a comprehensive "batch" type operation. In the alternative, the data terminal 510 may be in communication with such a host computer in an interactive or on-line mode via a data communication link, such as a radio frequency transceiver arrangement. The presence of such a radio transceiver is indicated as an alternative embodiment by a radio antenna 511, shown in phantom lines as the only externally visible element of such a transceiver. An elongate housing 512 preferably of a high-impact-strength plastic material encases the data terminal 510. Various types of materials are known and are commercially available.

The housing 512 of the data terminal 510 features a front surface 514. A display screen 515 is attached to the front surface 514 and may occupy a major portion of such front surface. A keyboard 516 is disposed adjacent the display screen 515. The display screen 515 is desirably a liquid crystal display screen ("LCD screen"). State of the art LCD screens generally employ "double super twist" technology which has been found to provide satisfactory viewing contrast under most direct lighting conditions. It is further possible to provide backlighting for LCD screens. However, power considerations may require selective disablement or even deletion of backlighting. As is apparent from FIG. 31, with respect to the housing 512, the LCD screen 515 is of a comparatively large size, a lateral overall width of the LCD screen 515 extending over general lateral boundaries 517 and 518 of the elongate shape of the housing 512. The longitudinal extent of the display screen also occupies a major portion of the front surface 514 of the data terminal 510. The keyboard 516, being limited in size by the available area on the front surface 514, consequently, would function primarily as a "numerical" keyboard, such as for numeric data entry.

An active display area 519 of the display screen 515 may be of a preferred minimum area of approximately 80×120 millimeters. The active area 519 is preferably a "bit-mapped" display, meaning that the display is comprised of an array or matrix of individually addressable display elements 521, and each such element or pixel 521, a representative location of which being referenced in FIG. 31, is driven by a data state of a particular individually addressable location in a memory of the data terminal 510. It is further found desirable that memory locations which control the activation of respective ones of the pixels 521 of the display screen 515 encompass more than single memory cells, such that more than a simple on-off function, but rather a gray scale value may be stored in each dedicated group of cells of the memory to be applied to the particularly addressed pixel 521.

Because of the electrical connections for implementing the display screen functions, the display screen 515 includes a boundary area which extends beyond the lateral confines of the housing 512 of the data terminal 510. Because of the desirably large active screen area 519, for the display information to be compatible with that on a standard computer screen, for example, the minimum desirable size of the display screen 515 tends to conflict with a design intent to maintain an overall size of the data terminal 510 as small as possible. In that the enlarged screen area of the data terminal 510 occupies a substantial part of the front surface 514 of the housing 512, the front surface 514 seemingly lacks the frontal surface area to accommodate both the numeric keyboard 516 and an alphabetical keyboard in addition to the display screen 515.

In overcoming space restraints on the front surface 514, the display screen 515 is ideally provided with a touch sensitive active surface area 532 as an overlay to the LCD screen for use as a keyboard or graphic data input system. The touch sensitive active surface area 532 may be implemented in a currently preferred embodiment by known technologies which employ, for example, either capacitive or resistive switching and sampling techniques to determine coordinates of a point on the surface area 532 against which a contact pressure is exerted. The overlay area 532 is essentially transparent, such that information displayed on the screen 515 remains clearly discernible. For example, the touch sensitive active area 532 may selectively be configured as a keyboard for manual input of alphabetical characters. In the preferred embodiment the size of the touch sensitive overlay area 532 corresponds to the active display area 519 of the LCD screen 515. It should be noted, however, that such choice is one of convenience, and that less than the active display area 519 of the display screen 515 may be encompassed by the touch sensitive active area 532.

A keyboard array 534 of active keys 536 may be displayed on the display screen 515 to correspond to the assigned key areas 536. Each of the key areas forms a discrete functional unit, in that a touch or pressure in any or all portions of such discrete area 536 results in one and the same input signal being generated. Indicia 537 of letters or of control functions also may be displayed directly beneath the respective active key areas 536 of the array 534 on the screen 515. The indicia 537 correspond to and identify input signals generated in response to contacts being made in such designated key areas 536. The display of the keyboard array 534 and of the indicia 537 is desirably selectively activated whenever keyboard entries are to made via the touch sensitive key areas 536. Also, it may be desired to alternate between a display of data as feedback of data entered and the display of the keyboard array 536. In a further variation of the described embodiment it is contemplated to deactivate the touch sensitive active area during periods in which the display screen 515 is used entirely for data display. Another advantage of the bit-mapped display screen 515 and the corresponding identifiable touch sensitive area 532 is that graphic data displaying a customer invoice may have a designated area, selectively activated, for receiving a signature as acknowledgment by a customer. The signature is stored in memory and may be recalled and reproduced on paper copies of the invoice by a central processing station. If all other areas displaying invoice information are deactivated, so as not to receive touch sensitive input, no changes can be made at the time the acknowledgment is requested. The use of alphanumerical data collection is further advanced by character recognition algorithms for processing and storing actual data in response to hand-produced inputs to the screen. For example, the display may provide line spacings as guides for receiving written characters. Within such designated boundaries a sensed pattern of graphic inputs is compared to a character of information. The apparently matching character is displayed. The display is an immediate feedback as to whether the correct character has been recognized. If an incorrect character appears, a graphic correction is made as a deviation with respect to the displayed character. Various other advantages will appear from further description of a preferred embodiment of the invention.

Touch sensitive screens require electrical couplings to be made along horizontal and vertical peripheral borders of the display screen 515. Such electrical couplings are space consuming and need to be made in addition to bit-mapped display screen connections, which are also made along the peripheral borders of the display screen 515. All of such connection regions constitute inactive areas of the screen 515. Preferably, to make optimum use of inactive horizontal and vertical connection areas adjacent the active area of the display screen 515, those areas are used for displaying permanently printed information, such as grid indicators 538 and cursor indicators 539. The peripherally displayed information helps in delineating the keyboard area 534 with respect to the display screen 515. In further reference to FIG. 31, the active area 519 of the display screen 515 is of elongate configuration, thereby minimizing the lateral projection of the display screen 515 beyond the lateral boundaries 517 and 518 of the housing 512. However, because of the size of the display screen being greater in the vertical direction of the data terminal 510, it appears desirable to display long lines of data in the longitudinal direction of the screen, hence perpendicular to the direction in which data might normally be displayed on the screen 515.

Adjacent the display screen 515, the remaining portion of the front surface 514 of the data terminal 510 is occupied by the numerical keyboard 516. According to a preferred embodiment of the invention, indicia 542 identifying the numerals or functions of the numerical keyboard 516 are disposed on a template 543. The template 543 is a flat sheet of material which features a plurality of apertures 544 to correspond in size and location to the size and location of keys 546 arranged in a preferred "3×4" array 47. The template 543 consequently fits over the keys 546 and rests when attached to the keyboard 516 adjacent and in contact with a base surface 548 of the keyboard 516. In the example of the keyboard 516 shown in FIG. 31 the keys 546 protrude through the base surface 548 and similarly through the template 543. As shown the keys 546 and circular in their plan view. It should be understood that keys of other shapes, for example, square keys or rectangular keys may be arranged as the circular keys 546 and marked with indicia 542 disposed on the template 543 as described herein.

The template 543 is preferably removably attached to the base surface 548 which may be part of the front surface 514 of the housing 512. Consistent with a desirable alternate orientation for displaying characters in lines on the display screen 515 longitudinally with respect to the data terminal 510, it appears to be advantageous to reorient the indicia 542 on the template 543 with respect to the data terminal 510 when information displayed on the screen 515 becomes reoriented with respect to the data terminal 510.

In reference to FIG. 32, physical external details of the data terminal 510 are shown in a side view thereof to illustrate particular handling features relative to the described orientations of displays. In a preferred embodiment, the housing 512 of the data terminal 510 features a frontal shell 630 including the described features of the display screen 515 and the keyboard 516, and a rear shell 631. The rear shell 631 may correspond dimensionally and functionally to the rear shell of a known and currently available data terminal marketed by the assignee of the present invention. It appears that the features as will be described in greater detail below of such currently existing housing shell are of advantage in combination with the present invention. The rear shell 631 includes a grip portion 633 which is formed by a contoured indentation 634 deviating from a generally rectangular shape of the data terminal 510. The inwardly formed grip conforming surfaces 635 of the indentation 634 may in a preferred embodiment be spanned by a hand strap 636, ends 637 and 638 of which being attached adjacent, respectively, upper and lower ends 639 and 640 of the rear housing shell 631. The grip-conforming surfaces 635 on each side of the rear housing shell 631 taper rearwardly toward each other to more readily conform to a user's hand. The hand strap 636 is in the preferred implementation of a width less than the width of the data terminal 510. Nevertheless, the hand strap 636 is of a width to firmly retain the user's hand against the contoured grip portion 633, even when the hand grip momentarily become relaxed. The data terminal 510 is readily grasped and held with one hand, either the left hand or the right hand of an operator, allowing the other hand of the operator the freedom to manipulate the keyboard 516 or the keyboard array 534 on the front surface of the data terminal 510. When the operator's hand is slipped between the hand strap 636 and the rear shell 631 of the housing 512 the data terminal 510 may be held in a first or upright position, in which the lower end 640 of the data terminal 510 is directed toward the operator, while the upper end 639 faces away from the operator. It is apparent that the hand strap 636 is also advantageously used to also hold the data terminal 510 in a second or lateral position at substantially right angles to such an upright position by turning the wrist of the hand that is holding the data terminal 510. For example, a person may be holding the data terminal by the left hand in the upright position. A twist of the wrist in a counterclockwise direction places the data terminal 510 into a lateral position with respect to the person holding the data terminal 510, in which a reoriented position of the indicia 542 would be desirable. In such a reoriented lateral position, the keyboard 516 would be disposed on the right hand end as viewed by the person holding the data terminal 510.

If a person were holding the data terminal 510 by the right hand in the upright position, the natural twisting motion permitted by the wrist would similarly transpose the data terminal 510 from such first upright position to a second lateral position in which the keyboard 516 would be disposed at the left end of the data terminal 510. Such latter reoriented position would ideally require a reorientation of the indicia 542 into an appropriate arrangement. Thus, a left handed person may require a different lateral orientation of the keyboard indicia 542 and functions than a right handed person. In contrast, the upright position is equally accessible to both left and right handed persons.

Further in reference to FIG. 32, the lower end 640 of the data terminal 510 may typically be a battery compartment 645 containing a power source (not shown) for electrically driving the functions of the data terminal 510. A bank 646 of external contact elements 647 may be disposed at the lower end 640 to provide an external power Input, such as for recharging batteries. The external contact elements 647 also serve for hard wired direct data transfer. Such direct data transfer mode via the contact elements 647 would be required when the data terminal 510 is intended to be operated in a batch type data communications mode, in which data collected to a period of operation of the data terminal 510 would be retained in a storage memory to be subsequently transferred in a single transfer operation to a host computer.

FIG. 33 shows a modification of the data terminal 510 as shown in FIG. 31, in that an optional indicia reader module 660 is shown attached to the upper end 639. The indicia reader may for example be a laser scanner bar code reader having an optical window 661 through which a laser beam cyclically scans across a bar code and through which a selectively reflective signal is received by the reader 660.

It is to be understood that the device provided by the accessory pod 30 may be a scanner including a laser scanner, an indicia reader, a wireless receiver, or a variety of other devices suitable for use with the portable data collection terminal 10.

As examples of some of the characteristics of the present invention, the portable data collection terminal 10 may have physical dimensions ranging between approximately 5.0"–9.0" length, 5.0"–9.0" width, and 1.5"–2.0" height; have a ruggedized, sealed housing 12 that protects the terminal 10 from all kinds of abuse, including multiple four-foot drops to concrete on any side without damage, including the face; a user replaceable handstrap 70 that is adjustable to secure the terminal 10 firmly in place and having an abrasion resistance providing one year typical use of fifty insertions per day, six days per week, fifty-two weeks per year, and may have a side hand strap that screws into the side of the terminal 10 that can be adjusted to fit a user's hand like a camcorder hand strap; have a display 26 having 320 pixels (width)×480 pixels (length), each pixel being 0.24 mm×0.24 mm minimum to provide forty characters by sixty lines; and have a keyboard 16 that has an ON/OFF key to place the terminal 10 in standby mode, disable keys, and physically protect against inadvertent actuation.

In view of the above detailed description of a preferred embodiment and modifications thereof, various other modifications will now become apparent to those skilled in the art. The claims below encompass the disclosed embodiments and all reasonable modifications and variations without departing from the spirit and scope of the invention.

Appendix A, entitled "Theory of Operation for PEN*KEY™ Data Terminal", Revision Level B, dated May 19, 1994, regarding update backlight device circuit, contains a further detailed description of the technological implementation of the functional blocks shown generally in FIGS. 20 through 26.

Appendix B, entitled "PEN*KEY™ Programmers Technical Notes" contains further detailed descriptions of the software and operation of the present invention, in order to provide a thorough disclosure of the form and use of the present invention.

Appendix B1, entitled "PEN*KEY™ Programmers Technical Notes", Rev. B, dated August, 1994, including Section 2, 4, 6–9, 11–12, 14, 19 and 22–25, contains further detailed descriptions of the software and operation of the present invention, in order to provide a thorough disclosure of the form and use of the present invention.

Appendix C, entitled "PEN*KEY™ Hand-held Computer" shows features and specifications of a commercial version of the illustrated embodiment.

Appendix D, entitled "Mobile Computing for the Real World" explains features and advantages of the illustrated embodiment from the standpoint of the end user.

Appendix E, entitled "PEN*KEY™ 'Penguin' ASIC Interface" contains a further detailed description of the functions carried out by the ASIC utilized in an embodiment of the present invention.

Appendix F, entitled "PEN*KEY™ Docking Stations" contains a further detailed description of the docking stations usable in an embodiment of the present invention.

Appendix G, entitled "Wireless Network-Enabled PEN*KEY™ Computer" contains a further detailed description of a wireless network-enabled hand-held terminable usable in an embodiment of the present invention.

Appendix H, a Norand Corporation brochure, contains a further detailed description of a hand-held terminal usable in an embodiment of the present invention.

Appendix I, Product Specification for PEN*KEY™ 386/486 Terminal, Norand Corporation, pages 1–17.

Appendix J, Functional Specification for PEN*KEY™ Vehicle Workstation 225-511-XXX, Norand Corporation, pages 1–7.

Appendix K, PEN*KEY™ Hand-Held Computer Theory of Operation, 1st Edition August 1994, Norand (table of contents, 3 pages; record of revisions, 1 page; pages 2-1 through 2-27).

Appendix L, PEN*KEY™ Hand-Held Computer Maintenance, Norand (table of contents, 1 page; pages 3-1 through 3-10).

Appendix M, PEN*KEY Work Inst 415-225-505 Rev. B (pages 2 through 22, 22A, 22B).

Appendix N, PEN*KEY™ Hand-Held Computer Specifications (2 pages).

Appendices A through N, inclusive, are not reproduced here, but are available in the file.

What is claimed is:

1. A portable data collection terminal system comprising:
   (a) a housing having, in a frontal side thereof, a display screen with a screen area having a boundary area thereabout with an overall width, said display screen including graphic data input means disposed within said screen area;
   (b) an accessory pod, connected to said housing;
   (c) an accessory device of said system associated with said accessory pod,
   (d) a handgrip extension mechanism having a width dimensioned substantially less than the overall width of said boundary area and disposed on said housing, opposite said frontal side, such that said screen is shielded from accidental contact by a user when holding said handgrip extension mechanism;
   (e) a handstrap secured to said terminal system so as to, cooperatively with the handgrip extension mechanism, facilitate holding said terminal system;
   (f) at least one activation switch adapted to activate said accessory device, and arranged for actuation by the hand gripping said handgrip extension mechanism; and
   (g) wherein said accessory device is an automatic optical reader which is arranged so as to be directed toward indicia to be read by means of the hand gripping said handgrip extension mechanism.

2. The portable data collection terminal system according to claim 1, wherein said automatic optical reader is a laser scanner.

3. A data collection terminal system according to claim 1, wherein said accessory pod has a concave surface.

4. A portable data collection terminal according to claim 3, wherein said handstrap does not interfere with the stability of the portable data collection terminal system when placed upon a generally planar surface.

5. A portable data collection terminal system according to claim 3, wherein said accessory pod has a gripping surface for at least one fingertip of a user when the portable data collection terminal system is held in one hand of the user.

6. A portable data collection terminal system according to claim 5, wherein said gripping surface comprises oppositely disposed members.

7. A portable data collection terminal system according to claim 6, further comprising an actuation switch disposed on at least one of said oppositely disposed members.

8. A portable data collection terminal system according to claim 6, further comprising two actuation switches, each of said two actuation switches being disposed on one of said oppositely disposed members, respectively.

9. A portable data collection system according to claim 8, wherein said two actuation switches are connected in parallel.

10. A portable data collection terminal system according to claim 6, wherein said oppositely disposed members provide a hand-grip of the portable data collection terminal system for operation in one hand of a user wherein the user may grip one of said oppositely disposed members with a fingertip of said one hand and grip the other of said oppositely disposed members with the palm of said one hand.

11. A portable data collection terminal system according to claim 10, wherein said one hand of a user may be either hand of the user.

12. A portable data collection terminal system according to claim 6, wherein said oppositely disposed members provide a hand-grip of the portable data collection terminal system for operation in one hand of a user wherein the user may grip one of said oppositely disposed members with a fingertip of said one hand and grip a portion of said frontal surface with the palm of said one hand.

13. A portable data collection terminal system according to claim 12, wherein the one hand of a user may be either hand of the user.

14. A portable data collection terminal system according to claim 6, wherein said oppositely disposed members are capable of stably supporting the portable data collection terminal system upon a generally planar surface.

15. A portable data collection terminal system according to claim 6, wherein said oppositely dispose members are capable of securely supporting the portable data collection terminal system upon a generally planar surface, said oppositely disposed members having a slope with respect to said housing such that said display is tilted toward a user with respect to the generally planar surface.

16. A portable data collection terminal system comprising:
   (a) a housing having a frontal side with lateral boundary margins, and having a digitizer display screen at said frontal side; and said housing having an underside with underside lateral margin portions;
   (b) a laser scanner for reading indicia;
   (c) said housing having, at the underside thereof, a handgrip portion by which said laser scanner is manually directed toward indicia to be read;
   (d) said handgrip portion providing a handgrip extending longitudinally at the underside of the housing, and having a longitudinally elongated handgrip bottom and longitudinally elongated handgrip side walls, the handgrip side walls serving to offset the handgrip bottom by a substantial distance from the underside lateral margin portions of the housing; and the underside lateral margin portions of the housing extending laterally beyond the handgrip side walls at both sides of the handgrip to further offset the handgrip bottom from the frontal side of the housing;
   (e) a handstrap secured to the terminal system so as to, cooperatively with the handgrip portion, facilitate holding said terminal system; and (f) at least one activation switch accessible by the hand of the user holding said handgrip for activating said laser scanner.

17. The portable data collection terminal system of claim 16, wherein said digitizer display screen has graphic data input means for capturing signatures.

18. The portable data collection terminal charge of claim 16, wherein said terminal system has a tactile keyboard with at least ten keys in addition to said digitizer display screen.

19. The portable data collection terminal system of claim 16, wherein said digitizer display screen comprises graphic data input means disposed generally coincident with the display screen area.

20. The portable data collection terminal system of claim 16, wherein said at least one activation switch comprises two activation switches arranged symmetrically at respective sides of the terminal system.

21. The portable data collection terminal system of claim 16, wherein said at least one activation switch comprises two activation switches, one of which is disposed such that it is operable by one of either a user's thumb or finger and the other of which is disposed such that it is operable by the other of a user's finger or thumb.

22. The portable data collection terminal system of claim 21, wherein said two activation switches are connected in parallel.

23. The portable data collection terminal system of claim 16, wherein said laser scanner comprises a scanner window serving as an exit window for a cyclically deflected laser scan beam, and which scanner window is to be directed toward indicia to be read by means of the user's hand which holds the terminal system by means of said handgrip.

24. A portable data collection terminal system comprising:
 (a) a housing having, at a frontal side thereof with a given maximum width, a frontal portion with a digitizer display screen having a boundary area thereabout defining an overall width;
 (b) a handgrip portion having a width dimensioned substantially less than the overall width of the boundary area, and disposed on the housing opposite the frontal side;
 (c) a hand strap disposed adjacent to the handgrip portion, for securing a user's grip on the handgrip portion, such that the user is assisted in holding the housing; and
 (d) the housing having an automatic indicia reader with an optical window oriented laterally of the housing, so as to be directed away from the user when the housing is in a lateral disposition, the automatic indicia reader providing a cyclically deflected laser beam directed through the optical window for effecting reading of indicia spaced from the housing.

25. A portable terminal system comprising:
 (a) a housing having, at a frontal side thereof, a frontal portion having a digitizer display screen of overall length and width occupying a preponderance of the length and width of the frontal side with a boundary area thereabout having an overall width; and
 (b) a handgrip extension mechanism having a width dimensioned substantially less than the overall width of the boundary area and disposed on the housing, opposite the digitizer display screen disposed on the frontal side, and of configuration for comfortable gripping by a hand of a user.

26. The portable terminal system of claim 25, further comprising:
 (c) an automatic indicia reader attached to the housing, including an optical window of configuration to accommodate automatic reading of indicia while the user directs the reader by means of the handgrip extension portion toward such indicia.

27. The portable terminal system of claim 25, further comprising:
 (c) a hand strap disposed adjacent to the handgrip extension portion, for securing a user's grip on the handgrip portion, such that the user's grip may be relaxed without losing support of the housing.

28. A portable computer tablet system comprising:
 (a) a housing having, at a frontal side thereof, a tablet configuration comprising a digitizer display screen having a boundary area thereabout with an overall width, the digitizer display screen accepting contact type input as a form of data entry; and
 (b) a handgrip extension mechanism having a width dimensioned substantially less than the overall width of the boundary area and disposed on the housing, opposite the frontal side, such that the digitizer display screen is comfortably supported by a user's hand gripping the handgrip extension mechanism during data entry by a user with the user's other hand.

29. The portable computer tablet system of claim 28, further comprising:
 (c) an automatic indicia reader secured to the housing adjacent the tablet configuration, and including an optical window for effecting reading of indicia spaced from the housing.

30. The portable computer tablet system of claim 28, further comprising:
 (c) a hand strap disposed adjacent to the handgrip extension portion, for securing a user's grip on the handgrip portion, such that the user's grip may be relaxed without losing support of the housing.

31. The portable computer tablet system of claim 28, wherein the digitizer display screen has an active area with a width of at least eighty millimeters, and the tablet configuration has a width substantially greater than the width of the active area and extends beyond the lateral confines of the handgrip extension portion at each side of the tablet configuration.

32. The portable computer tablet system of claim 28, wherein the frontal side further includes a keyboard generally in the same plane as the digitizer display screen, the keyboard accepting keystroke input as a further form of data entry.

33. The portable computer tablet system of claim 32, wherein the keyboard comprises at least ten keys, generally in the same plane as the digitizer display screen.

34. In a portable computer tablet system, characterized by a digitizer display screen accepting contact type input as a means of data entry, means for effectively supporting the tablet system comprising:
 (a) a housing for holding the digitizer display screen in a frontal portion located at a frontal side of the housing with a boundary area thereabout having an overall width; and
 (b) a handgrip extension mechanism having a width dimensioned substantially less than the overall width of the boundary area and disposed on the housing, directly opposite the frontal portion, such that the digitizer display screen is comfortably supported by a user's hand gripping the handgrip extension mechanism during data entry by the user at the digitizer display screen.

35. The portable computer tablet system supporting means of claim 34, further comprising:
(c) a hand strap disposed adjacent to the handgrip extension portion, for securing a user's grip on the handgrip portion, such that the user's grip may be relaxed without losing support of the housing.

36. A portable data collection terminal system comprising:
(a) a housing having, at a generally planar frontal side thereof, a display screen including a boundary area thereabout having an overall maximum width and data input lying generally parallel to the general plane of the frontal side during use of the terminal system; and
(b) an elongated handgrip portion having a width dimensioned substantially less than the overall maximum width of the display screen including the boundary area and disposed longitudinally along the housing opposite the frontal side, so as to enable a user to provide longitudinally extensive support directly underlying the frontal side.

37. The portable data collection terminal system of claim 36 wherein the display screen and data input present a tablet configuration capable of presenting at least twenty-six key-representing regions.

38. The portable data collection terminal system of claim 36, wherein the display screen is parallel to the general plane of the frontal side during use of the terminal system and occupies a preponderance of the maximum width of the frontal side of the housing.

39. The portable data collection terminal system of claim 36, wherein the display screen is parallel to the general plane of the frontal side during use of the terminal system, and is of elongate configuration, such that the overall size of the display screen is greater in a longitudinal direction parallel to the elongated handgrip portion than in the transverse direction.

40. The portable data collection terminal system of claim 36, wherein the display screen is parallel to the general plane of the frontal side during use of the terminal system, and the display screen is longitudinally elongated parallel to the elongated handgrip portion, with the longitudinal extent of the display screen overall occupying a preponderance of the frontal side of the housing.

41. The portable data collection terminal system of claim 36, wherein the display screen is parallel to the general plane of the frontal side during use of the terminal system, and comprises at least 9600 square millimeters of active area.

42. The portable data collection terminal system of claim 36, wherein the display screen is parallel to the general plane of the frontal side during use of the terminal system, and comprises a bit-mapped matrix of individually addressable elements.

43. The portable data collection terminal system of claim 36, wherein the display screen is parallel to the general plane of the frontal side during use of the terminal system, and comprises an array of elements having gray scale values individually assignable thereto.

44. The portable data collection terminal system of claim 36, wherein the handgrip portion is shaped so as to readily conform to both a right hand and a left hand of a user.

45. The portable data collection terminal system of claim 36, wherein the display screen is parallel to the general plane of the frontal side during use and is immovably fixed relative to the housing.

46. The portable data collection terminal system of claim 45, wherein backlighting is provided for the display screen.

47. The portable data collection terminal system of claim 46, wherein selective disablement of backlighting for the display screen may be effected in response to certain power considerations.

48. A portable data collection terminal system comprising:
(a) a frontal housing shell having, at a frontal side thereof, a display including a boundary area thereabout having an overall maximum width and data input lying generally parallel to the frontal side during use; and
(b) a rear handgrip shell having a handgrip portion with a width dimensioned less than the overall maximum width of the display including the boundary area, the rear handgrip shell being disposed adjacent the frontal housing shell and directly underlying the display and data input during use.

49. The portable computer terminal system of claim 48, wherein the display has a touch sensitive overlay to accept contact type data input, said handgrip portion directly underlying a longitudinally extensive portion of the touch sensitive overlay.

50. The portable computer terminal system of claim 49, wherein the size of the touch sensitive overlay corresponds to the size of an active display portion of the display.

51. The portable computer terminal system of claim 48, wherein the display comprises a digitizer display screen lying substantially parallel to the frontal side during use of the terminal system, and configurable as an alphanumeric keyboard.

52. The portable computer terminal system of claim 51, wherein the digitizer display screen alternates between displaying the alphanumeric keyboard and displaying feedback on what has been entered by a user.

53. The portable computer terminal system of claim 52, wherein touch sensitive functions of the digitizer display screen are deactivated when the digitizer display screen is only displaying feedback on what has been entered by a user.

54. The portable computer terminal system of claim 48, wherein the display comprises a digitizer display screen lying substantially parallel to the frontal side during use of the terminal system, and operable to receive handwritten signatures input to the digitizer display screen.

55. The portable computer terminal system of claim 48, wherein the display comprises a digitizer display screen lying substantially parallel to the frontal side during use of the terminal system, and operable to recognize handwritten characters input to the digitizer display screen.

56. The portable computer terminal system of claim 55, wherein the digitizer display screen immediately displays feedback as to whether a handwritten character input has been recognized.

57. The portable computer terminal system of claim 56, wherein the digitizer display screen accommodates a graphic correction with respect to a character displayed if the character is incorrect.

58. The portable computer terminal of claim 48, wherein the display has an active area comprising a digitizer display screen, and outside borders outside the active area which extend beyond the lateral confines of the handgrip portion, and has printed indicators proximate the outside borders of the display.

59. A portable data terminal system comprising:
(a) a housing having, at a generally planar frontal side thereof, a display screen with an active screen area having lateral boundary portions thereabout, and a keyboard with at least ten projecting keys, the display screen including manually operated data input means disposed generally coincident with the active screen area and lying in a plane generally parallel to the general plane of the frontal side during use of the terminal system; and (b) an elongated handgrip extension mechanism having a longitudinal axis extending generally parallel to the general plane of the frontal side and forming a handgrip underlying only a limited central longitudinal portion of the frontal side such that said handgrip is disposed within the confines of the lateral boundary portions of the frontal side, with undersides of the lateral boundary portions forming an overhanging ledge between the handgrip and the frontal side of the housing, while the width of the handgrip accommodates comfortable gripping by a hand of a user regardless of the greater width of the frontal side and provides for user support of the manual data input means from the underside thereof during manual operation of the manual data input means by the other hand of the user.

60. A portable data terminal system comprising:

(a) a housing having, at a generally planar frontal side thereof, a display screen with an active screen area having lateral boundary portions thereabout, the display screen including manually operated data input means disposed generally coincident with the active screen area and lying in a plane generally parallel to the general plane of the frontal side during use of the terminal system;

(b) an elongated handgrip extension mechanism having a longitudinal axis extending generally parallel to the general plane of the frontal side and forming a handgrip underlying only a central longitudinal portion of the frontal side of limited width such that said handgrip is disposed within the confines of the lateral boundary portions of the frontal side, with undersides of the lateral boundary portions forming an overhanging ledge-like barrier directly between the handgrip and the manually operated data input means while the width of the handgrip accommodates comfortable gripping by a hand of a user regardless of the greater width of the frontal side; and (c) a handstrap secured to said terminal system so as to, cooperatively with said handgrip extension mechanism, facilitate holding said terminal system.

61. The portable data terminal system of claim 60, wherein the display screen including the manually operated data input means comprises a digitizer display system with an active area having a width greater than at least eighty millimeters disposed between the lateral boundary portions, and having a length in the direction parallel to the longitudinal axis of the handgrip extension portion of at least one hundred and twenty millimeters.

62. The portable data terminal system of claim 60, the housing having an automatic indicia reading device mounted therewith so as to be directed toward indicia to be read by means of the hand gripping the handgrip.

63. The portable data terminal system of claim 62, the housing further having at least one reader activation switch disposed for actuation by the hand of the user gripping the handgrip.

64. The portable data terminal system of claim 62, the housing further having reader activation switches disposed on respective opposite sides of the handgrip extension portion.

65. The portable data terminal system of claim 64, the handgrip being of configuration for comfortable gripping by the right or left hand of the user, either of which may actuate one of the reader activation switches.

66. The portable data terminal system of claim 60, the housing having an automatic indicia reading device mounted therewith so as to be directed toward indicia to be read by means of the hand gripping the handgrip, and the automatic indicia reading device providing a cyclically deflected laser beam for automatically effecting reading of automatic indicia.

67. The portable data terminal system of claim 60, wherein the display screen including the manually operated data input means comprises a digitizer display system with an active area having a width greater than at least eighty millimeters disposed between the lateral boundary portions, and having a length in the direction parallel to the longitudinal axis of the handgrip extension portion of at least one hundred and twenty millimeters, and the housing has an automatic indicia reading device mounted therewith so as to be directed toward indicia to be read by means of the hand gripping the handgrip.

68. The portable data terminal system of claim 67, the housing further having at least one reader activation switch disposed for actuation by the hand of the user gripping the handgrip.

69. The portable data terminal system of claim 67, the housing further having reader activation switches disposed on respective opposite sides of the handgrip extension portion.

70. The portable data terminal system of claim 69, the handgrip being of configuration for comfortable gripping by the right or left hand of the user, either of which may actuate one of the reader activation switches.

71. The portable data terminal system of claim 60, wherein the display screen including the manually operated data input means comprises a digitizer display system with an active area having a width greater than at least eighty millimeters disposed between the lateral boundary portions, and having a length in the direction parallel to the longitudinal axis of the handgrip extension portion of at least one hundred and twenty millimeters, and the housing has an automatic indicia reading device mounted therewith so as to be directed toward indicia to be read by means of the hand gripping the handgrip, with the automatic indicia reading device providing a cyclically deflected laser beam for automatically effecting reading of automatic indicia.

72. The portable data terminal system of claim 60, the active display screen occupying a preponderance of the width of the frontal side of the housing, and occupying a preponderance of the length of the frontal side of the housing, the housing having an automatic indicia reading device mounted therewith so as to be directed toward indicia to be read by means of the hand gripping the handgrip.

73. The portable data terminal system of claim 72, the housing further having at least one reader activation switch disposed for actuation by the hand of the user gripping the handgrip.

74. The portable data terminal system of claim 72, the housing further having reader activation switches disposed on respective opposite sides of the handgrip extension portion.

75. The portable data terminal system of claim 74, the handgrip being of configuration for comfortable gripping by the right or left hand of the user, either of which may actuate one of the reader activation switches.

76. The portable data terminal system of claim 60, the active display screen occupying a preponderance of the width of the frontal side of the housing, and occupying a preponderance of the length of the frontal side of the housing, the housing having an automatic indicia reading device mounted therewith so as to be directed toward indicia to be read by means of the hand gripping the handgrip, and the automatic indicia reading device providing a cyclically deflected laser beam for automatically effecting reading of automatic indicia.

77. The portable data terminal system of claim 60, the active screen area being longitudinally elongated with a longitudinal screen axis being parallel to the longitudinal axis of the handgrip extension portion, the housing having an automatic indicia reading device mounted therewith so as to be directed toward indicia to be read by means of the hand gripping the handgrip.

78. The portable data terminal system of claim 77, the housing further having at least one reader activation switch disposed for actuation by the hand of the user gripping the handgrip.

79. The portable data terminal system of claim 77, the housing further having reader activation switches disposed on respective opposite sides of the handgrip extension portion.

80. The portable data terminal system of claim 79, the handgrip being of configuration for comfortable gripping by the right or left hand of the user, either of which may actuate one of the reader activation switches.

81. The portable data terminal system of claim 60, the active screen area being longitudinally elongated with a longitudinal screen axis being parallel to the longitudinal axis of the handgrip extension portion, the housing having an automatic indicia reading device mounted therewith so as to be directed toward indicia to be read by means of the hand gripping the handgrip, and the automatic indicia reading device providing a cyclically deflected laser beam for automatically effecting reading of automatic indicia.

82. A portable data collection terminal system comprising:
    (a) a housing having, in a frontal side thereof, a frontal portion having a display screen having a boundary area thereabout;
    (b) an accessory pod connected to said housing;
    (c) an accessory device of said system associated with said accessory pod;
    (d) a handgrip extension mechanism having a width dimensioned less than a width of said boundary area and disposed on said housing, opposite said frontal side, such that said display screen is shielded from accidental contact by a user when holding said handgrip extension mechanism;
    (e) a handstrap secured to said terminal system so as to cooperatively, with the handgrip extension mechanism, facilitate holding said terminal system; and
    (f) at least one activation switch adapted to activate said accessory device and arranged for actuation by the user's hand gripping said handgrip extension mechanism.

83. A portable data collection terminal system according to claim 82, wherein said accessory device is an automatic optical reader which is arranged so as to be directed toward indicia to be read by means of the user's hand gripping said handgrip extension mechanism.

84. The portable data collection terminal system according to claim 83, wherein said automatic optical reader is a laser scanner.

85. A portable data collection terminal system according to claim 82, wherein said accessory pod has a concave surface.

86. A portable data collection terminal according to claim 85, wherein said concave surface accommodates said handstrap such that said handstrap does not interfere with the stability of the portable data collection terminal system when placed upon a generally planar surface.

87. A portable data collection terminal system according to claim 85, wherein said concave surface provides a gripping surface for at least one fingertip of a user when the portable data collection terminal system is held in one hand of the user.

88. A portable data collection terminal system according to claim 87, wherein said gripping surface comprises oppositely disposed members.

89. A portable data collection terminal system according to claim 88, further comprising an actuation switch disposed on at least one of said oppositely disposed members.

90. A portable data collection terminal system according to claim 88, further comprising two actuation switches, each of said two actuation switches being disposed on one of said oppositely disposed members, respectively.

91. A portable data collection system according to claim 90, wherein said two actuation switches are connected in parallel.

92. A portable data collection terminal system according to claim 85, wherein said oppositely disposed members provide a hand-grip of the portable data collection terminal system for operation in one hand of a user wherein the user may grip one of said oppositely disposed members with a fingertip of said one hand and grip the other of said oppositely disposed members with the palm of said one hand.

93. A portable data collection terminal system according to claim 92, wherein said one hand of a user may be either hand of the user.

94. A portable data collection terminal system according to claim 88, wherein said oppositely disposed members provide a hand-grip of the portable data collection terminal system for operation in one hand of a user wherein the user may grip one of said oppositely disposed members with a fingertip of said one hand and grip a portion of said frontal surface with the palm of said one hand.

95. A portable data collection terminal system according to claim 94, wherein said one hand of a user may be either hand of the user.

96. A portable data collection terminal system according to claim 88, wherein said oppositely disposed members are capable of stably supporting the portable data collection terminal system upon a generally planar surface.

97. A portable data collection terminal system according to claim 88, wherein said oppositely dispose members are capable of stably supporting the portable data collection terminal system upon a generally planar surface, said oppositely disposed members having a slope with respect to said housing such that said display is tilted toward a user with respect to the generally planar surface.

98. A portable data collection terminal system comprising:
    (a) a housing having a frontal side with lateral boundary margins and having a display screen at said frontal side; said housing having an underside with underside lateral margin portions;
    (b) an automatic information reader for reading information;
    (c) said housing having, at the underside thereof, a handgrip portion by which said information reader is manually directed toward an information source to be read;
    (d) said handgrip portion providing a handgrip extending longitudinally at said underside of said housing and having a longitudinally elongated handgrip bottom and longitudinally elongated handgrip side walls, said handgrip side walls serving to offset said handgrip bottom by a substantial distance from said underside lateral margin portions of said housing; said underside lateral margin portions of said housing extending laterally beyond said handgrip side walls at both sides of said handgrip portion to further offset said handgrip bottom from said frontal side of said housing;

(e) at least one activation switch accessible by the user's hand holding said handgrip for activating the automatic operation of said information reader; and (f) a handstrap secured to said terminal system so as to cooperatively with the handgrip, facilitate maintaining the directing of said terminal system while operating said at least one activation switch.

99. The portable data collection terminal system of claim 98, wherein said display screen has a graphic data input arrangement for capturing signatures.

100. The portable data collection terminal system of claim 98, wherein said terminal system has a tactile keyboard with at least ten keys separate from said display screen.

101. The portable data collection terminal system of claim 98, wherein said display screen comprises a graphic data input arrangement disposed generally coincident with said display screen.

102. The portable data collection terminal system of claim 98, wherein said at least one activation switch comprises two activation switches arranged symmetrically at respective sides of said terminal system.

103. The portable data collection terminal system of claim 98, wherein said at least one activation switch comprises two activation switches, one of which is disposed to be operable by one of either a user's thumb or finger and the other of which is disposed to be operable by the other of the user's finger or thumb.

104. The portable data collection terminal system of claim 103, wherein said two activation switches are arranged to operate in parallel.

105. The portable data collection terminal system of claim 98, wherein said automatic information reader has a scanner window serving as an exit window for a cyclically deflected laser scan beam, said scanner window being directable toward an information source to be read by means of the user's hand holding said terminal system by means of said handgrip.

106. A portable data collection terminal system comprising:

(a) a housing having, at a frontal side thereof with a given maximum width, a frontal portion with a display screen including a boundary area thereabout;

(b) a handgrip portion having a width dimensioned substantially less than said maximum width of said frontal portion including said boundary area and disposed on said housing opposite said frontal side;

(c) a hand strap disposed adjacent to said handgrip portion for securing a user's grip on said handgrip portion such that the user is assisted in holding said housing; and (d) said housing having an automatic information reader with an exit axis oriented laterally of said housing so as to be directed away from the user as said housing assumes a lateral disposition.

107. A portable data collection terminal system according to claim 106, wherein said automatic information reader provides a cyclically deflected laser beam directed generally along said exit axis for effecting reading of indicia spaced from said housing.

108. A portable terminal system comprising:

(a) a housing having, at a frontal side thereof, a frontal portion having a display screen of width occupying a preponderance of the width of said frontal portion and having a boundary area thereabout defining an overall width; and (b) a handgrip extension mechanism having a width dimensioned substantially less than said overall width of said boundary area and disposed on said housing, opposite a portion of said display screen, and of configuration for comfortable gripping by a hand of a user.

109. The portable terminal system of claim 108, further comprising an automatic information reader attached to said housing and of construction to accommodate automatic reading of information as the user directs said reader by means of said handgrip extension portion toward an information source.

110. The portable terminal system of claim 108, further comprising a hand strap disposed adjacent to said handgrip extension portion for securing a user's grip on said handgrip portion such that the user's grip may be relaxed without losing support of said housing.

111. A portable data terminal system comprising:

(a) a housing having, at a generally planar frontal side thereof, a display screen with an active screen area having lateral boundary portions thereabout, and manually operated data input means lying in a plane generally parallel to the general plane of said frontal side during use of said terminal system; and (b) an elongated handgrip extension mechanism having a longitudinal axis extending generally parallel to the general plane of said frontal side and forming a handgrip underlying only a central longitudinal portion of said frontal side of limited width such that said handgrip is disposed within the confines of the lateral boundary portions of said frontal side, with undersides of said lateral boundary portions forming an overhanging ledge-like barrier directly between said handgrip and said manually operated data input means while the width of said handgrip accommodates comfortable gripping by a hand of a user regardless of the greater width of said frontal side.

112. A portable data collection terminal system comprising:

(a) a housing having, in a frontal side thereof, a frontal portion having a display screen with a screen area and a boundary area thereabout, said display screen including graphic data input means disposed generally within said screen area;

(b) an accessory pod structured to hold an accessory device of said system and connected to said housing;

(c) a handgrip extension mechanism having a width dimensioned less than a width of said boundary area and disposed on said housing, opposite said frontal side, such that said screen is shielded from accidental contact by a user when holding said handgrip extension mechanism; and (d) a handstrap secured to said terminal system so as to, cooperatively with said handgrip extension mechanism, operatively facilitate holding of said terminal system.

113. The portable data collection terminal system of claim 112, wherein said graphic data input means is disposed generally coincident with said screen area.

114. The portable data collection terminal system of claim 113, wherein said graphic data input means includes a touch sensitive overlay to accept contact-type data input.

115. The portable data collection terminal system of claim 113, wherein said display screen comprises a digitizer display screen operable to receive handwritten signatures input to said digitizer display screen.

116. The portable data collection terminal system of claim 113, wherein said display screen comprises a digitizer display screen operable to recognize handwritten characters input to said digitizer display screen.

117. The portable data collection terminal system of claim 116, wherein said digitizer display screen accommodates a graphic correction with respect to a displayed character if said character is incorrect.

118. The portable data collection terminal system of claim 112, wherein said display screen comprises a digitizer display screen.

119. The portable data collection terminal system of claim 118, wherein said digitizer display screen is configured to accept contact-type input as a form of data entry.

120. The portable data collection terminal system of claim 118, wherein said digitizer display screen has an active area with a width of at least eighty millimeters.

121. The portable data collection terminal system of claim 118, wherein said frontal side further includes a keyboard generally in the same plane as said digitizer display screen, said keyboard accepting keystroke input as a further form of data entry.

122. The portable data collection terminal system of claim 121, wherein said keyboard comprises at least ten keys, generally in the same plane as said digitizer display screen.

123. The portable data collection terminal system of claim 118, wherein said digitizer display screen is configured as a tablet configuration.

124. The portable data collection terminal system of claim 118, wherein said digitizer display screen and data input means are configured to provide at least twenty-six key-representing regions.

125. The portable data collection terminal system of claim 118, wherein said digitizer display screen occupies a preponderance of the maximum width of said frontal side of said housing.

126. The portable data collection terminal system of claim 118, wherein said terminal system has a tactile keyboard with at least ten keys in addition to said digitizer display screen.

127. The portable data collection terminal system of claim 112, wherein said display screen comprises a digitizer display screen configurable as an alphanumeric keyboard.

128. The portable data collection terminal system of claim 127, wherein said digitizer display screen alternates between displaying said alphanumeric keyboard and displaying feedback of input entered by a user.

129. The portable data collection terminal system of claim 128, wherein touch sensitive functions of said digitizer display screen are deactivated as said digitizer display screen is displaying feedback of input entered by the user.

130. The portable data collection terminal system of claim 112, wherein said active display screen occupies a preponderance of the width of said frontal side of said housing.

131. The portable data collection terminal system of claim 112, wherein said active display screen occupies a preponderance of the length of said frontal side of said housing.

132. The portable data collection terminal system of claim 112, wherein said active screen area is longitudinally elongated with a longitudinal screen axis being parallel to a longitudinal axis of said handgrip extension mechanism.

133. The portable data collection terminal system of claim 112, wherein said display screen is parallel to the general plane of said frontal side and said display screen is longitudinally elongated parallel to said handgrip extension mechanism such that the longitudinal extent of said display screen overall occupies a preponderance of said frontal side of said housing.

134. The portable data collection terminal system of claim 112, wherein said display screen is parallel to the general plane of said frontal side and said screen area comprises at least 9600 square millimeters of active area.

135. The portable data collection terminal system of claim 112, wherein said display screen is parallel to the general plane of said frontal side and comprises a bit-mapped matrix of individually addressable elements.

136. The portable data collection terminal system of claim 112, wherein said display screen is parallel to the general plane of said frontal side and comprises an array of elements having gray scale values individually assignable thereto.

137. The portable data collection terminal system of claim 112, wherein said display screen is parallel to the general plane of said frontal side and is immovably fixed relative to said housing.

138. The portable data collection terminal system of claim 112, wherein backlighting is provided for said display screen.

139. The portable data collection terminal system of claim 138, wherein selective disablement of backlighting for said display screen may be effected in response to certain power considerations.

140. The portable data collection terminal system of claim 112, wherein said display screen is parallel to the general plane of said frontal side and is of elongate configuration such that the overall size of said display screen is greater in a longitudinal direction parallel to said handgrip extension mechanism than in a direction transverse thereto.

141. The portable data collection terminal system of claim 112, wherein said housing includes at least one activation switch configured to activate said accessory device, said at least one activation switch disposed for actuation by the hand of the user gripping said handgrip extension mechanism.

142. The portable data collection terminal system of claim 141, wherein said at least one activation switch comprises two activation switches arranged near opposite sides of said handgrip extension mechanism.

143. The portable data collection terminal system of claim 142, wherein said handgrip extension mechanism is configured to provide comfortable gripping by either the right or left hand of the user, either of which hands may actuate one of said two activation switches.

144. The portable data collection terminal system of claim 143, wherein said two activation switches are connected in parallel.

145. The portable data collection terminal system of claim 141, wherein said at least one activation switch comprises two activation switches, one of which is disposed to be operable by one of either a user's thumb or finger and the other of which is disposed to be operable by the other of a user's finger or thumb.

146. The portable data collection terminal system of claim 112, wherein said accessory device comprises a laser scanner configured to operatively read indicia.

147. The portable data collection terminal system of claim 146, wherein said laser scanner comprises a scanner window serving as an exit window for a cyclically deflected laser scan beam, said scanner window being directable toward the indicia to be read by means of the user's hand which holds the terminal system by means of said handgrip extension mechanism.

148. The portable data collection terminal system of claim 112, wherein said accessory device comprises an automatic indicia reader having an optical window oriented laterally of said housing such that said reader is directed away from the user as said housing assumes a lateral disposition, said reader providing a cyclically deflected laser beam directed through said optical window for effecting reading of indicia spaced from said housing.

149. The portable data collection terminal system of claim 112, wherein said handgrip extension mechanism comprises a rear handgrip shell having a width dimensioned less than a maximum width of said frontal side, the rear handgrip shell being disposed directly underlying said display screen and said graphic data input means during use thereof.

150. A portable data collection terminal system according to claim 112, wherein said accessory pod has a concave surface.

151. A portable data collection terminal according to claim 150, wherein said concave surface accommodates said handstrap such that said handstrap does not interfere with the stability of the portable data collection terminal system when placed upon a generally planar surface.

152. A portable data collection terminal system according to claim 150, wherein said concave surface provides a gripping surface for at least one fingertip of a user when the portable data collection terminal system is held in one hand of the user.

153. A portable data collection terminal system according to claim 152, wherein said gripping surface comprises oppositely disposed members.

154. A portable data collection terminal system according to claim 153, further comprising an actuation switch disposed on at least one of said oppositely disposed members.

155. A portable data collection terminal system according to claim 153, further comprising two actuation switches, each of said two actuation switches being disposed on one of said oppositely disposed members, respectively.

156. A portable data collection system according to claim 155, wherein said two actuation switches are connected in parallel.

157. A portable data collection terminal system according to claim 153, wherein said oppositely disposed members provide a hand-grip of the portable data collection terminal system for operation in one hand of a user wherein the user may grip one of said oppositely disposed members with a fingertip of said one hand and grip the other of said oppositely disposed members with the palm of said one hand.

158. A portable data collection terminal system according to claim 157, wherein said one hand of a user may be either hand of the user.

159. A portable data collection terminal system according to claim 153, wherein said oppositely disposed members provide a hand-grip of the portable data collection terminal system for operation in one hand of a user wherein the user may grip one of said oppositely disposed members with a fingertip of said one hand and grip a portion of said frontal surface with the palm of said one hand.

160. A portable data collection terminal system according to claim 159, wherein said one hand of a user may be either hand of the user.

161. A portable data collection terminal system according to claim 153, wherein said oppositely disposed members are capable of stably supporting the portable data collection terminal system upon a generally planar surface.

162. A portable data collection terminal system according to claim 153, wherein said oppositely dispose members are capable of stably supporting the portable data collection terminal system upon a generally planar surface, said oppositely disposed members having a slope with respect to said housing such that said display is tilted toward a user with respect to the generally planar surface.

163. A portable data collection terminal system comprising:
(a) a housing having, at a frontal side thereof, a frontal portion having a display screen with a boundary area thereabout and data input means;
(b) an accessory pod structured to hold an accessory device and connected to said housing,
(c) a handgrip extension mechanism having a width dimensioned less than a width of said boundary area and disposed on said housing, opposite said frontal side, such that said display screen and said data input means are shielded from accidental contact by a user when holding said handgrip extension mechanism; and
(d) a handstrap secured to said terminal system so as to, cooperatively with said handgrip extension mechanism, facilitate holding of said terminal system.

164. The portable data collection terminal system according to claim 163, including at least one activation switch adapted to activate said accessory device.

165. The portable data collection terminal system of claim 164, wherein said at least one activation switch comprises two activation switches, one of which is disposed near one side of said handgrip extension mechanism to be operable by one of either a user's thumb or finger and the other of which is disposed near the other side of said handgrip extension mechanism to be operable by the other of a user's finger or thumb.

166. The portable date collection terminal system of claim 165, wherein said two activation switches are operable in parallel.

167. The portable data collection terminal system of claim 163, wherein said data input means comprises graphic data input means disposed coincident with said display screen.

168. The portable data collection terminal system of claim 163, wherein said data input means comprises a keyboard.

169. The portable data collection terminal system of claim 163, wherein said data input means comprises both a keyboard and graphic data input means disposed coincident with said display screen.

170. The portable data collection terminal system of claim 163, wherein said pod has an extension wall disposed transversely to said handgrip extension mechanism and has at least one activation switch adapted to activate said accessory device.

171. The portable data collection terminal system of claim 170, wherein said at least one activation switch comprises a diaphragm-type switch.

172. The portable data collection terminal system of claim 163, wherein said accessory device comprises a laser scanner.

173. A portable data collection terminal system according to claim 163, wherein said accessory pod has a concave surface.

174. A portable data collection terminal according to claim 173, wherein said concave surface accommodates said handstrap such that said handstrap does not interfere with the stability of the portable data collection terminal system when placed upon a generally planar surface.

175. A portable data collection terminal system according to claim 173, wherein said concave surface provides a gripping surface for at least one fingertip of a user when the portable data collection terminal system is held in one hand of the user.

176. A portable data collection terminal system according to claim 175, wherein said gripping surface comprises oppositely disposed members.

177. A portable data collection terminal system according to claim 176, further comprising an actuation switch disposed on at least one of said oppositely disposed members.

178. A portable data collection terminal system according to claim 176, further comprising two actuation switches, each of said two actuation switches being disposed on one of said oppositely disposed members, respectively.

179. A portable data collection system according to claim 174, wherein said two actuation switches are connected in parallel.

180. A portable data collection terminal system according to claim 176, wherein said oppositely disposed members provide a hand-grip of the portable data collection terminal system for operation in one hand of a user wherein the user may grip one of said oppositely disposed members with a fingertip of said one hand and grip the other of said oppositely disposed members with the palm of said one hand.

181. A portable data collection terminal system according to claim 180, wherein said one hand of a user may be either hand of the user.

182. A portable data collection terminal system according to claim 126, wherein said oppositely disposed members provide a hand-grip of the portable data collection terminal system for operation in one hand of a user wherein the user may grip one of said oppositely disposed members with a fingertip of said one hand and grip a portion of said frontal surface with the palm of said one hand.

183. A portable data collection terminal system according to claim 182, wherein said one hand of a user may be either hand of the user.

184. A portable data collection terminal system according to claim 176, wherein said oppositely disposed members are capable of securely supporting the portable data collection terminal system upon a generally planar surface.

185. A portable data collection terminal system according to claim 176, wherein said oppositely dispose members are capable of securely supporting the portable data collection terminal system upon a generally planar surface, said oppositely disposed members having a slope with respect to said housing such that said display is tilted toward a user with respect to the generally planar surface.

186. A portable data collection terminal system comprising:

(a) a housing having, at a frontal side thereof with a given maximum width, a frontal portion with a display screen having a boundary area thereabout defining an overall width;

(b) a handgrip portion having a width dimensioned substantially less than said overall width defined by said boundary area and disposed on said housing opposite said frontal side;

(c) a hand strap disposed adjacent to said handgrip portion for securing a user's grip on said handgrip portion such that the user is assisted in holding said housing; and (d) said housing having an automatic optical reader with an optical window oriented laterally of said housing so as to be directed away from the user as said housing assumes a lateral disposition.

187. The portable data collection terminal system of claim 186, wherein said optical window is configured to accommodate automatic reading of indicia as the user directs said reader by means of said handgrip portion toward such indicia.

188. The portable data collection terminal system of claim 186, wherein said hand strap is configured to operably support said housing even as the user's gripping of said handgrip portion is relaxed.

* * * * *